US011149829B2

(12) United States Patent
Matsuto et al.

(10) Patent No.: US 11,149,829 B2
(45) Date of Patent: Oct. 19, 2021

(54) ELECTRIC ACTUATOR

(71) Applicant: NTN CORPORATION, Osaka (JP)

(72) Inventors: Takushi Matsuto, Shizuoka (JP);
Shinsuke Hirano, Shizuoka (JP);
Atsushi Ikeda, Shizuoka (JP); Tomomi Ishikawa, Shizuoka (JP); Yoshinori Ikeda, Shizuoka (JP); Tatsuji Inoue, Shizuoka (JP)

(73) Assignee: NTN CORPORATION, Osaka (JP)

( * ) Notice: Subject to any disclaimer, the term of this patent is extended or adjusted under 35 U.S.C. 154(b) by 418 days.

(21) Appl. No.: 16/084,026

(22) PCT Filed: Mar. 24, 2017

(86) PCT No.: PCT/JP2017/012192
§ 371 (c)(1),
(2) Date: Sep. 11, 2018

(87) PCT Pub. No.: WO2017/170290
PCT Pub. Date: Oct. 5, 2017

(65) Prior Publication Data
US 2020/0300344 A1     Sep. 24, 2020

(30) Foreign Application Priority Data

Mar. 30, 2016  (JP) .............................. JP2016-069068
Jul. 21, 2016  (JP) .............................. JP2016-143376

(51) Int. Cl.
*F16H 25/24*     (2006.01)
*F16H 25/22*     (2006.01)
(Continued)

(52) U.S. Cl.
CPC ..... *F16H 25/2454* (2013.01); *F16H 25/2204* (2013.01); *H02K 7/06* (2013.01);
(Continued)

(58) Field of Classification Search
CPC ......... F16H 25/2454; F16H 2025/2081; F16H 25/2204; F16H 2025/2087; H02K 7/06; H02K 7/116
See application file for complete search history.

(56) References Cited

U.S. PATENT DOCUMENTS 4,635,491 A * 1/1987 Yamano .................. B66B 9/025
187/209
2012/0098368 A1* 4/2012 Xiong ....................... H02K 7/06
310/77

FOREIGN PATENT DOCUMENTS

| JP | 2002-120996 | | 4/2002 |
|----|-------------|---|--------|
| JP | 2002352318 A | * | 12/2002 |
| JP | 5243018 | | 7/2013 |
| JP | 2013-160335 | | 8/2013 |

(Continued)

OTHER PUBLICATIONS

Machine translation of WO 2015146963 (Year: 2015).*
(Continued)

*Primary Examiner* — Randell J Krug
(74) *Attorney, Agent, or Firm* — Wenderoth, Lind & Ponack, L.L.P.

(57) ABSTRACT

Provided is an electric actuator including: a drive part (2); a motion conversion mechanism part (3) configured to convert a rotary motion from the drive part (2) into a linear motion a transmission gear mechanism (28) configured to transmit a driving force from the drive part (2) to the motion conversion mechanism part (3); and a lock mechanism part (7) configured to prevent the drive by the motion conversion mechanism part (3), wherein the transmission gear mechanism (28) includes a first gear (30) arranged on the drive part (2) side and a second gear (31) arranged on the motion conversion mechanism part (3) side, and wherein the lock mechanism part (7) is arranged on an opposite side of the drive part (2) with respect to the first gear (30), and on the (Continued)

motion conversion mechanism part (3) side with respect to a rotation center line of the first gear (30).

7 Claims, 16 Drawing Sheets

(51) Int. Cl.
   *H02K 7/06* (2006.01)
   *H02K 7/116* (2006.01)
   *F16H 25/20* (2006.01)

(52) U.S. Cl.
   CPC ...... *H02K 7/116* (2013.01); *F16H 2025/2081* (2013.01); *F16H 2025/2087* (2013.01)

(56) References Cited

FOREIGN PATENT DOCUMENTS

| WO | WO-2014200052 A1 | * | 12/2014 | ............. H02K 7/116 |
| WO | WO-2015146963 A1 | * | 10/2015 | |
| WO | 2015/190509 | | 12/2015 | |

OTHER PUBLICATIONS

Machine translation of JP 2002352318 (Year: 2002).*
International Preliminary Report on Patentability and Written Opinion of the International Searching Authority dated Oct. 2, 2018 in International (PCT) Application No. PCT/JP2017/012192.
Office Action dated Aug. 7, 2020 in corresponding Chinese Patent Application No. 201780018887.9, with partial English translation.
International Search Report dated Jun. 13, 2017 in International (PCT) Application No. PCT/JP2017/012192.

* cited by examiner

ELECTRIC ACTUATOR

TECHNICAL FIELD

The present invention relates to an electric actuator.

BACKGROUND ART

In recent years, electrification of automobiles and the like has been promoted for power saving and reduction in fuel consumption. For example, a system for operating an automatic transmission, a brake, a steering wheel, and the like of the automobile with use of power of an electric motor has been developed and brought to the market. As an electric actuator for use in such an application, there has been known an electric linear actuator employing a ball screw mechanism configured to convert a rotary motion of a motor into a motion in a linear direction.

Incidentally, in the ball screw mechanism, an efficiency of transmission of a driving force to an object device to be operated is very high. However, when an external force is input to the ball screw from a side of the object device to be operated, a ball screw shaft may move in an axial direction. In view of such a problem, hitherto, there has been proposed a ball screw mechanism provided with a lock mechanism configured to prevent the ball screw from being driven by a reverse input from the side of the object device to be operated.

For example, in Patent Literature 1, as illustrated in FIG. 21, there is provided a shaft 300 serving as a lock member configured to be freely engaged with and disengaged from a gear 400 configured to transmit a driving force from an electric motor 100 to a ball screw 200, and the rotation of the gear 400 is blocked through use of the shaft 300, thereby preventing drive of the ball screw 200.

CITATION LIST

Patent Literature 1: JP 5243018 B2

SUMMARY OF INVENTION

Technical Problem

However, the configuration described in Patent Literature 1 has the following problem. Specifically, the shaft 300 is arranged at a position far in a radial direction from the ball screw 200 with respect to a rotation center of the gear 400, and hence an axis-to-axis distance between the shaft 300 and the ball screw 200 is thus long. As a result, the size of the electric actuator increases, and a space required for installation increases.

The present invention has been made in view of the above-mentioned problem, and therefore has an object to provide an electric actuator capable of achieving downsizing.

Solution to Problem

According to one embodiment of the present invention, as a technical measure for achieving the above-mentioned object, there is provided an electric actuator, comprising: a drive part; a motion conversion mechanism part configured to convert a rotary motion from the drive part into a linear motion in an axial direction in parallel with an output shaft of the drive part; a driving force transmission part comprising a transmission gear mechanism configured to transmit a driving force from the drive part to the motion conversion mechanism part; and a lock mechanism part configured to prevent the drive by the motion conversion mechanism part, wherein the transmission gear mechanism comprises a first gear arranged on the drive part side and a second gear arranged on the motion conversion mechanism part side, and wherein the lock mechanism part is arranged on an opposite side of the drive part with respect to the first gear and on the motion conversion mechanism part side with respect to a rotation center line of the first gear.

Through arrangement of the lock mechanism part on the opposite side of the drive part with respect to the first gear and on the motion conversion mechanism part side with respect to the rotation center line of the first gear in such a manner, the lock mechanism part can be arranged close to the motion conversion mechanism part without considering interference with the drive part. As a result, the downsizing of the electric actuator can be achieved.

According to one embodiment of the present invention, as a technical measure for achieving the above-mentioned object, there is provided an electric actuator, comprising: a drive part; a motion conversion mechanism part configured to convert a rotary motion from the drive part into a linear motion in an axial direction in parallel with an output shaft of the drive part; a driving force transmission part comprising a transmission gear mechanism configured to transmit a driving force from the drive part to the motion conversion mechanism part; and a lock mechanism part configured to prevent the drive by the motion conversion mechanism part, wherein the transmission gear mechanism comprises a first gear arranged on the drive part side and a second gear arranged on the motion conversion mechanism part side, and wherein the lock mechanism part is configured to restrict a rotation of the first gear so as to prevent the drive by the motion conversion mechanism part through engagement with the first gear on the motion conversion mechanism part side with respect to a rotation center line of the first gear.

With such a configuration that the lock mechanism part is engaged with the first gear on the motion conversion mechanism part side with respect to the rotation center line thereof, the arrangement of the lock mechanism part close to the motion conversion mechanism part is promoted, and the downsizing of the electric actuator is easily achieved.

For engagement of the lock mechanism part with the first gear, it is preferred that an engagement hole, with which the lock mechanism part is engaged, be formed in a side surface of the first gear crossing the axial direction. In this case, the lock mechanism part is not engaged with teeth of the first gear. Thus, application of a load on the teeth by the engagement can be prevented, and reliability increases.

The lock mechanism part may comprise: a lock member, which is engageable with and disengeable from the engagement hole; and a sliding screw device configured to convert a rotary motion of a rotary motor into a linear motion, to thereby drive the lock member so as to bring the lock member into at least any one of a locking state of engaging the lock member with the engagement hole and an unlocking state of releasing the locking state. Through use of the sliding screw device in the lock mechanism part, the linear motion can be achieved through the simple configuration comprising a small number of parts, and further downsizing can be achieved.

Further, the actuator case may comprise a rotation restriction part configured to restrict a rotation of a member of the sliding screw device performing the linear motion. In such a manner, it is not required to independently provide a rotation restriction member, which is advantageous for the downsizing.

For example, the actuator case can provide the function of the rotation restriction part by fixing one of a sliding screw nut and a sliding screw shaft forming the sliding screw device to the lock member, fixing another one of the sliding screw nut and the sliding screw shaft to an output shaft of the rotary motor, forming a distal end portion side of the lock member into a flat plate shape, and forming, in the actuator case, a through hole having a rectangular cross section into which the distal end portion side of the lock member is inserted. In other words, in this case, the rotation of the lock member is restricted in the through hole through insertion of the distal end portion side of the lock member formed into the flat plate shape into the through hole formed into the rectangular shape in cross section. Thus, the rotation of the sliding screw nut or the sliding screw shaft fixed to the lock member is restricted, which enables the linear motion.

When the rotation is restricted between the lock member and the through hole as described above, it is preferred that the distal end portion side of the lock member be arranged coaxially with the output shaft of the rotary motor. With this configuration, a contact portion (rotation restriction portion) between the lock member and the through hole is close to the rotation center line of the rotary motor in the radial direction. Thus, a moment received by the rotation restriction portion is reduced, and a resistance against the linear motion of the lock member can be reduced. As a result, action performance of the lock member increases, and reliability of the electric actuator increases.

The lock mechanism part may comprise a spring, which is configured to urge the lock member in a direction that brings the lock member into the locking state, and the rotary motor may be configured to drive the lock member so that the lock member is switched to the unlocking state against an urging force of the spring when the drive part performs driving. In this case, even when power is not supplied to the rotary motor, the locking state can be maintained by the urging force of the spring.

The rotation of the drive part may be transmitted from the first gear to the second gear while a speed of the rotation is reduced. In this case, a rotation torque is transmitted from the first gear to the second gear while the rotation torque is increased. Thus, as described above, when the first gear having a lower rotation torque is used as the gear to be engaged with the lock mechanism part, a load applied to the lock mechanism part upon the engagement can be reduced compared with the case of engagement with the second gear having the higher rotation torque. Moreover, in this case, the gear to be engaged with the lock mechanism part is the first gear having a higher rotation speed. Hence, the positioning can finely be carried out compared with the case in which the gear to be engaged with the lock mechanism part is the second gear having a reduced rotation speed, and a position accuracy of stopping the motion conversion mechanism part increases.

The electric actuator may further comprise a shaft case, which is configured to accommodate a shaft portion of the motion conversion mechanism part performing the linear motion, and the shaft case may comprise a holder portion, which is configured to hold the lock mechanism part. In the electric actuator comprising such a shaft case, as described above, the lock mechanism part is arranged close to the motion conversion mechanism part, and thus downsizing of the shaft case can be achieved.

When the lock member is advanced to be engaged with the engagement hole, the drive part may be caused to drive so as to swing the gear in one direction and an opposite direction thereof in the circumferential direction, to thereby match a phase of the engagement hole in the circumferential direction with the lock member.

In such a manner, even when the engagement hole and the lock member are displaced from one another in phase in the circumferential direction, by swinging the gear to match the phase of the engagement hole in the circumferential direction with the lock member, the lock member can reliably be inserted into the engagement hole. Moreover, the phase matching can be performed with the small amount of rotation compared with the case in which the gear is rotated in one direction for the phase matching of the engagement hole. Therefore, influence on a stop position of the electric actuator in a linear motion direction is small, and the position can accurately be maintained.

The electric actuator may further comprise a lock sensor, which is configured to detect advanced and retreated positions of the lock member. The lock sensor may be configured to detect the position of the lock member when the lock member is advanced while the gear is being swung, and when insertion of the distal end portion of the lock member into at least the engagement hole is started, and the advance of the lock member may be stopped when a predetermined period has elapsed after the lock sensor detects the position of the lock member.

In such a manner, the lock member can reliably be inserted into the engagement hole by detecting the position of the lock member through use of the lock sensor when insertion of the distal end portion of the lock member into at least the engagement hole is started, and by stopping the advance of the lock member when the predetermined period has elapsed after the lock sensor detects the position of the lock member. In other words, a state of insertion of the lock member into the engagement hole can be managed so as not to be insufficient or excessive by setting the timing of stopping the advance of the lock member to a time point when the predetermined period has elapsed after count is started when insertion of the lock member into at least the engagement hole is started.

It is desired that the gear be swung by a width corresponding to an amount of a half pitch of an interval between the engagement holes in each of the one direction and the opposite direction thereof in the circumferential direction.

Through setting of such a width of the swing of the gear, the phase of the engagement hole can reliably be matched with the lock member.

The gear may be swung in the one direction and the opposite direction thereof in the circumferential direction by causing the drive part to drive when the lock member is retreated to be disengaged from the engagement hole.

In such a manner, through swinging of the gear when the lock member is retreated to be disengaged from the engagement hole, the lock member and the gear (an engagement surface of the engagement hole) can be prevented from being stuck, thereby promoting the disengagement of the lock member from the engagement hole. Thus, the locking state can reliably be released.

Advantageous Effects of Invention

According to the present invention, an electric actuator suitable for downsizing can be provided.

DESCRIPTION OF EMBODIMENTS

Now, description is made of the present invention with reference to the accompanying drawings. In the respective drawings for illustrating the present invention, components such as members and component parts having the same functions or shapes are denoted by the same reference symbols as long as the components can be distinguished, and description thereof is therefore omitted after the description is made once.

Figure 1:
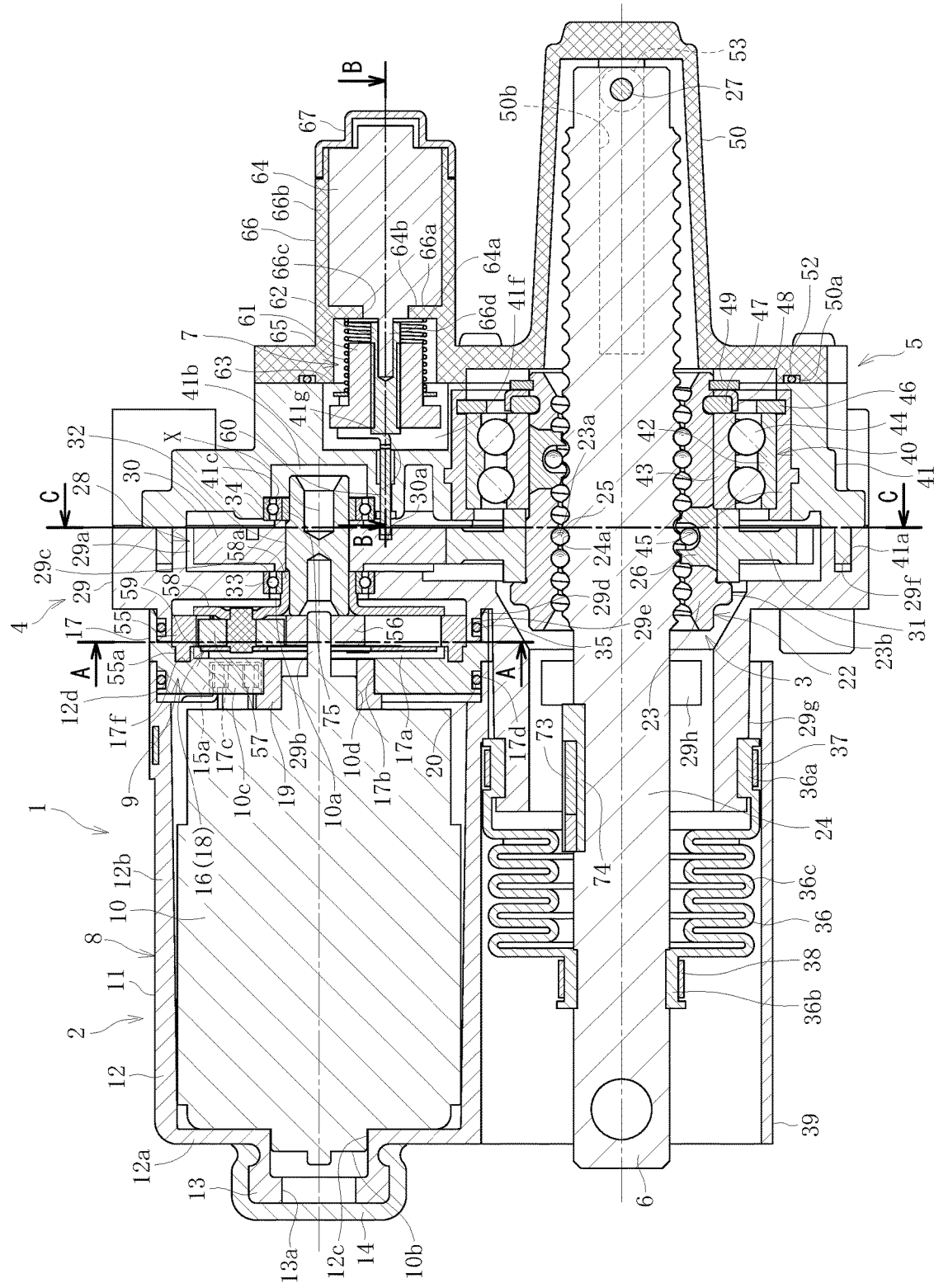
FIG. 1 is a vertical sectional view of an electric actuator according to one embodiment of the present invention.
Figure 2:
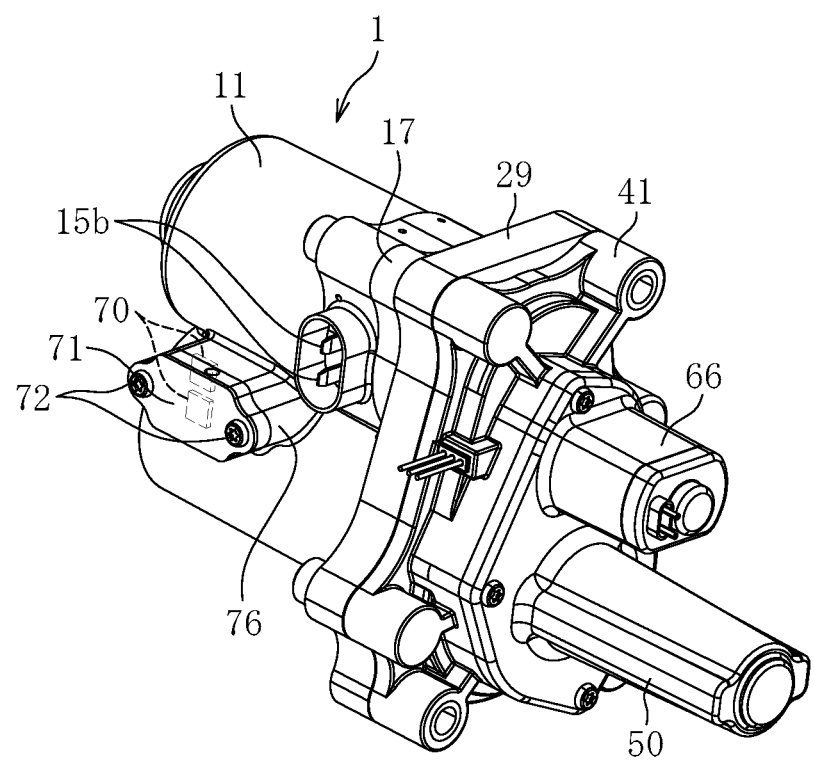
FIG. 2 is an external perspective view of the electric actuator.
Figure 3:
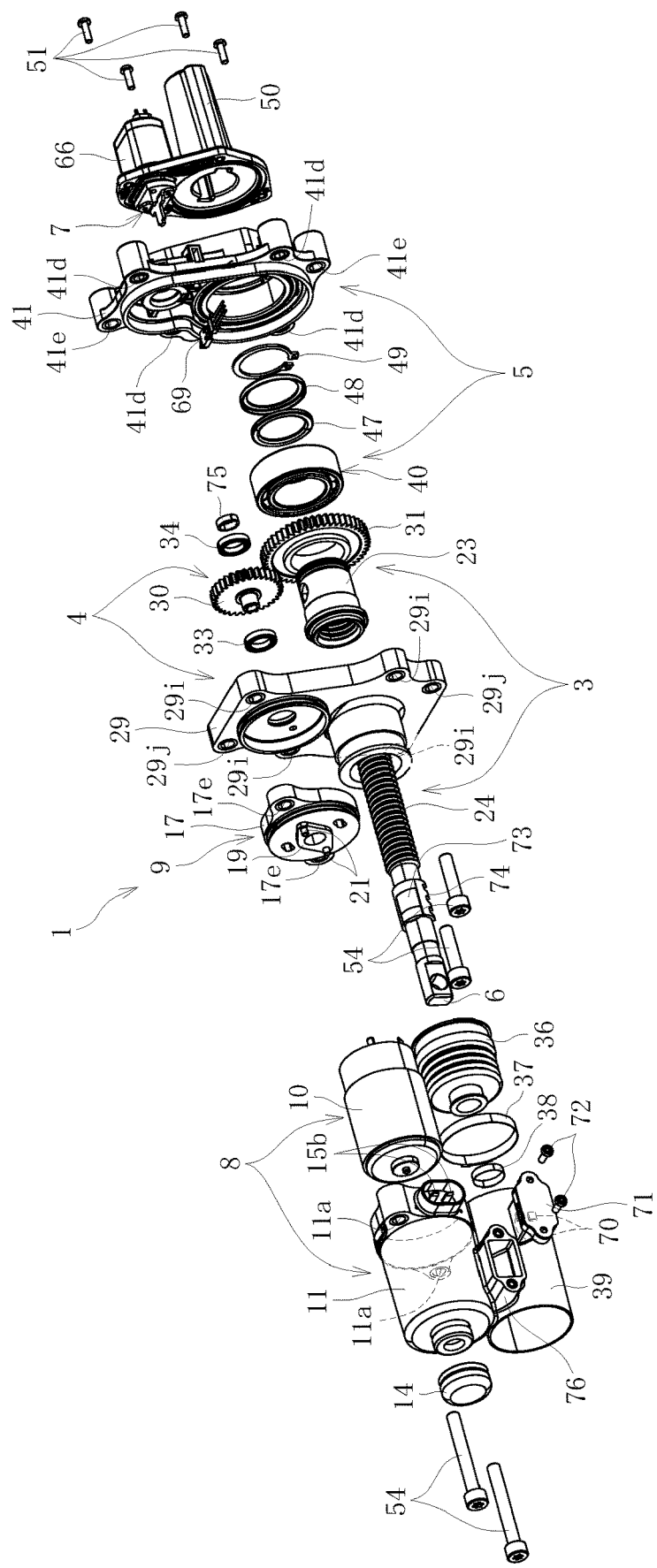
FIG. 3 is an exploded perspective view of the electric actuator.

FIG. 1 is a vertical sectional view for illustrating an assembled state of an electric actuator according to one embodiment of the present invention. FIG. 2 is an external perspective view for illustrating the assembled state of the electric actuator. FIG. 3 is an exploded perspective view of the electric actuator.

As illustrated in FIG. 1, an electric actuator 1 of this embodiment mainly comprises a drive part 2, a motion conversion mechanism part 3, a driving force transmission part 4, a motion-conversion-mechanism support part 5, an operation part 6, and a lock mechanism part 7. The drive part 2 is configured to generate a driving force. The motion conversion mechanism part 3 is configured to convert a rotary motion from the drive part 2 into a linear motion. The driving force transmission part 4 is configured to transmit the driving force from the drive part 2 to the motion conversion mechanism part 3. The motion-conversion-mechanism support part 5 is configured to support the motion conversion mechanism part 3. The operation part 6 is configured to output the motion of the motion conversion mechanism part 3. The lock mechanism part 7 is configured to prevent the motion conversion mechanism part 3 from driving. Moreover, the drive part 2 comprises a motor part 8 and a speed reduction mechanism part 9.

Each of the parts forming the electric actuator 1 has a case. Component parts are accommodated in each of the cases. Specifically, the motor part 8 comprises a motor case 11 configured to accommodate a driving motor 10. The speed reduction mechanism part 9 comprises a speed reduction gear case 17 configured to accommodate a speed reduction gear mechanism 16. Moreover, the driving force transmission part 4 comprises a transmission gear case 29 configured to accommodate a transmission gear mechanism 28. The motion-conversion-mechanism support part 5 comprises a bearing case 41 configured to accommodate a support bearing 40. Further, respective pairs of the motor part 8 and the speed reduction mechanism part 9, the speed reduction mechanism part 9 and the driving force transmission part 4, and the driving force transmission part 4 and the motion-conversion-mechanism support part 5 are configured to be capable of being coupled to and decoupled from one another while the pairs are accommodated in the cases. Further, a shaft case 50 is configured to be capable of being coupled to and decoupled from the bearing case 41. Now, description is made of detailed configurations of the respective parts forming the electric actuator 1.

The motor part 8 mainly comprises the driving motor (DC motor) 10 and the motor case 11. The driving motor 10 is configured to drive the motion conversion mechanism part 3. The motor case 11 is configured to accommodate the driving motor 10. The motor case 11 comprises a case main body 12 and a projecting portion 13. The case main body 12 has a bottomed cylindrical shape, and is configured to accommodate the driving motor 10 therein. The projecting portion 13 projects from a bottom portion 12a of the case main body 12 to the outside. The projecting portion 13 has a hole portion 13a which communicates to an internal space of the case main body 12. The hole portion 13a is sealed by a seal member 14 that is made of resin and covers an outer surface of the projecting portion 13.

Under a state in which the driving motor 10 is inserted from an opening portion 12d of the case main body 12 into an inside of the case main body 12, an end surface of the driving motor 10 on an inner side in an insertion direction is held in abutment against the bottom portion 12a of the case main body 12. Moreover, a fitting hole 12c is formed in a center portion of the bottom portion 12a. A projection 10b of the driving motor 10 in the inner side in the insertion direction is fitted to the fitting hole 12c, thereby preventing interference of a rear end (left end portion in FIG. 1) of an output shaft 10a projecting from the projection 10b with the bottom portion 12a of the motor case 11. Further, an inner peripheral surface of a peripheral wall portion 12b of the case main body 12 is reduced in diameter in a tapered shape from the opening portion 12d side toward the bottom portion 12a side. When the driving motor 10 is inserted into the case main body 12, an outer peripheral surface of the driving motor 10 on the inner side in the insertion direction comes into contact with the inner peripheral surface of the peripheral wall portion 12b. With this configuration, the driving motor 10 is supported through the contact with the inner peripheral surface of the case main body 12 and the fitting to the fitting hole 12c under the state in which the driving motor 10 is inserted into the case main body 12.

Figure 4:
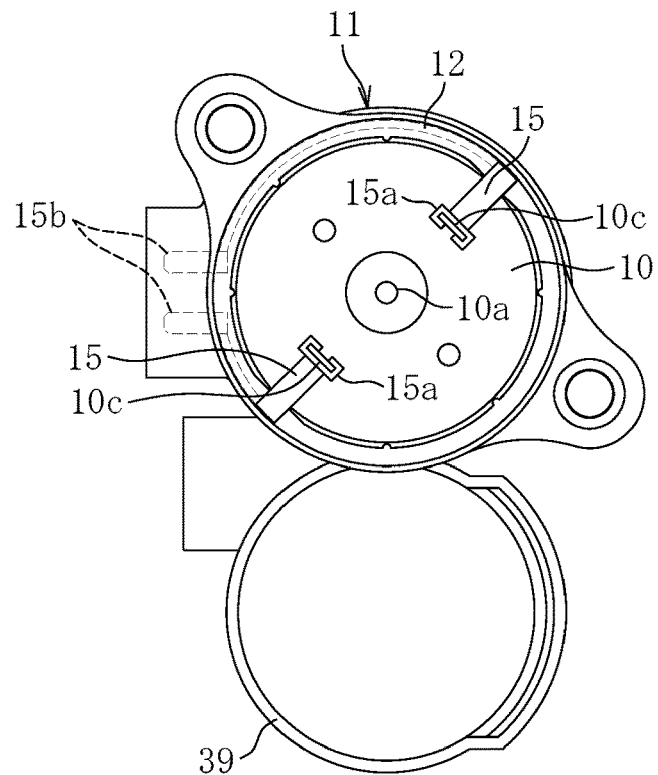
FIG. 4 is a view of a motor case as seen from an opening portion side.

Moreover, as illustrated in FIG. 4, which is a view of the motor case 11 as seen from the opening portion 12d side, a pair of bus bars 15 configured to connect the driving motor 10 to a power supply is mounted to the case main body 12. One end portion 15a of each of the bus bars 15 is connected to a motor terminal 10c through crimping, and another end portion 15b is exposed from the case main body 12 to the outside (see FIG. 2 and FIG. 3). The end portions 15b of the bus bars 15 exposed to the outside are connected to the power supply.

Next, description is made of the speed reduction mechanism part 9.

As illustrated in FIG. 1, the speed reduction mechanism part 9 mainly comprises the speed reduction gear mechanism 16 and the speed reduction gear case 17. The speed reduction gear mechanism 16 is configured to reduce the speed of the driving force of the driving motor 10 and output the driving force. The speed reduction gear case 17 is configured to accommodate the speed reduction gear mechanism 16. The speed reduction gear mechanism 16 is formed of a planetary-gear speed reduction mechanism 18 comprising a plurality of gears and the like. A detailed configuration of the planetary-gear speed reduction mechanism 18 is described later.

The speed reduction gear case 17 has an accommodating recessed portion 17a configured to accommodate the planetary-gear speed reduction mechanism 18 from an opposite side of the driving motor 10. Moreover, the speed reduction gear case 17 is formed so as to enable a motor adaptor 19 serving as a motor mounting member to be mounted thereto. The motor adaptor 19 is a tubular member, and a projection 10d of the driving motor 10 on an output side (right side in FIG. 1) is inserted into and fitted to an inner peripheral surface of the motor adaptor 19. The speed reduction gear case 17 has a fitting hole 17b to which the motor adaptor 19 is fitted. The motor adaptor 19 is inserted from the driving motor 10 side into the fitting hole 17b and mounted to the fitting hole 17b.

The speed reduction gear case 17 is configured to be capable of being fitted to the motor case 11 and the transmission gear case 29 described later and arranged on the opposite side of the motor case 11. A portion of the speed reduction gear case 17 arranged on the motor case 11 side is internally fitted to the opening portion 12d side of the motor case 11. A portion of the speed reduction gear case 17 arranged on the transmission gear case 29 side is externally fitted to the transmission gear case 29. Moreover, the speed reduction gear case 17 is fastened to the driving motor 10 through bolts 21 (see FIG. 3 and FIG. 6) together with the motor adaptor 19 while being fitted to the motor case 11. On the driving motor 10 side of the speed reduction gear case 17, there are formed recessed portions 17c configured to prevent interference with the motor terminals 10c projecting from the driving motor 10 and with the end portions 15a of the bus bars 15 crimped to the motor terminals 10c while the speed reduction gear case 17 and the motor case 11 are fitted to each other. Moreover, amounting groove 17d configured to mount an O ring 20 is formed in an outer peripheral surface (fitting surface) of the speed reduction gear case 17 to be fitted to an inner peripheral surface of the motor case 11.

Next, description is made of the motion conversion mechanism part 3.

The motion conversion mechanism part 3 is formed of a ball screw 22. The ball screw 22 mainly comprises a ball screw nut 23, a ball screw shaft 24, a large number of balls 25, and deflectors 26. The ball screw nut 23 serves as a rotary body. The ball screw shaft 24 is a shaft portion performing a linear motion. The deflectors 26 serve as circulation members. Spiral grooves 23a and 24a are respectively formed in an inner peripheral surface of the ball screw nut 23 and an outer peripheral surface of the ball screw shaft 24. The balls 25 are loaded between both of the spiral grooves 23a and 24a, and the deflectors 26 are assembled therebetween. With this configuration, the balls 25 in two rows circulate.

The ball screw nut 23 receives the driving force from the driving motor 10, to thereby rotate in a forward direction or a backward direction. Meanwhile, the rotation of the ball screw shaft 24 is restricted by a pin 27 that is provided on a rear end portion (right end portion in FIG. 1) thereof and serves as a rotation restriction member. Therefore, when the ball screw nut 23 rotates, the balls 25 circulate along both the spiral grooves 23a and 24a and the deflectors 26, and the ball screw shaft 24 advances and retreats in the axial direction. FIG. 1 is a view for illustrating a state in which the ball screw shaft 24 is arranged at an initial position given when the ball screw shaft 24 retreats most to the right side of FIG. 1. Moreover, the ball screw shaft 24 is arranged in parallel with the output shaft 10a of the driving motor 10. The rotary motion from the driving motor 10 is converted into a linear motion in the axial direction parallel with the output shaft 10a by the ball screw shaft 24. A distal end portion (left end portion in FIG. 1) of the ball screw shaft 24 in an advancing direction functions as the operation part (actuator head) 6 configured to operate an object device to be operated.

Next, description is made of the driving force transmission part 4.

The driving force transmission part 4 mainly comprises the transmission gear mechanism 28 and the transmission gear case 29. The transmission gear mechanism 28 is configured to transmit the driving force from the driving motor 10 of the drive part 2 to the ball screw 22 being the motion conversion mechanism part 3. The transmission gear case 29 is configured to accommodate the transmission gear mechanism 28. The transmission gear mechanism 28 comprises a drive gear 30 as a first gear on a drive side and a driven gear 31 as a second gear on a driven side meshing with the drive gear 30.

A gear boss 32 is press-fitted to a rotation center portion of the drive gear 30. The drive gear 30 is rotatably supported through intermediation of the gear boss 32 by two rolling bearings 33 and 34 mounted to both the transmission gear case 29 and the bearing case 41 described later. Meanwhile, the driven gear 31 is press-fitted and fixed to the outer peripheral surface of the ball screw nut 23. When the driving force from the driving motor 10 is transmitted to the drive gear 30 through intermediation of the planetary-gear speed reduction mechanism 18, the driven gear 31 and the ball screw nut 23 integrally rotate, and the ball screw shaft 24 advances and retreats.

The transmission gear case 29 comprises an accommodating recessed portion 29a configured to accommodate the drive gear 30 and the driven gear 31 therein. Moreover, the transmission gear case 29 has an insertion hole 29b through which the gear boss 32 is inserted. On an inner peripheral surface of the insertion hole 29b, there is formed a bearing mounting surface 29c to which the one rolling bearing 33 configured to support the gear boss 32 is mounted. Moreover, the transmission gear case 29 comprises an annular projection 29d fitted to an inner peripheral surface of the speed reduction gear case 17. In an outer peripheral surface (fitting surface) of the annular projection 29d, there is formed a mounting groove 29e configured to mount an O ring 35. Moreover, in a surface of the transmission gear case 29 on the bearing case 41 side, there is formed a fitting recessed portion 29f in a groove form fitted to the bearing case 41.

Moreover, the transmission gear case 29 comprises a cylindrical portion 29g projecting toward a distal end portion side (left side in FIG. 1) of the ball screw shaft 24. The cylindrical portion 29g is a portion arranged so as to cover a periphery of the ball screw shaft 24 under a state in which the driven gear 31 is accommodated in the transmission gear case 29, and the ball screw 22 is assembled to the driven gear 31. A boot 36 configured to prevent foreign substances from entering the transmission gear case 29 is mounted between the cylindrical portion 29g and the ball screw shaft 24. The boot 36 comprises a large-diameter end portion 36a, a small-diameter end portion 36b, and a bellows portion 36c, which connects the large-diameter end portion 36a and the small-diameter end portion 36b to each other, and expands and contracts in the axial direction. The large-diameter end portion 36a is fixed to a mounting portion of an outer peripheral surface of the cylindrical portion 29g by tightening a boot band 37. The small-diameter end portion 36b is fixed to a mounting portion of the outer peripheral surface of the ball screw shaft 24 by tightening a boot band 38. Moreover, the cylindrical portion 29g has a vent hole 29h which is configured to cause the air to communicate between an inside and an outside of the boot 36 when the boot 36 expands and contracts. Moreover, a boot cover 39 arranged around the boot 36 is provided integrally with the motor case 11.

Next, description is made of the motion-conversion-mechanism support part 5.

The motion-conversion-mechanism support part 5 mainly comprises the support bearing 40 and the bearing case 41. The support bearing 40 is configured to support the ball screw 22 being the motion conversion mechanism part 3. The bearing case 41 is configured to accommodate the support bearing 40. The support bearing 40 is formed of a back-to-back double-row angular contact ball bearing comprising an outer ring 42, an inner ring 43, and balls 44 in a plurality of rows interposed therebetween as main components.

The support bearing 40 is accommodated in a sleeve 45 formed integrally with the bearing case 41, and is fixed through a snap ring 46 mounted to an inner peripheral surface of the sleeve 45. Moreover, the support bearing 40 is fixed by being press-fitted to an outer peripheral surface of the ball screw nut 23 on a rear end side (right side in FIG. 1) of the ball screw shaft 24 with respect to the driven gear 31. A movement in the axial direction of the support bearing 40 and the driven gear 31 fixed to the outer peripheral surface of the ball screw nut 23 is restricted by a restriction projection 23b formed on the ball screw nut 23 on the driven gear 31 side and a restriction member 47 mounted on the support bearing 40 side. The restriction member 47 comprises a pair of semicircular members, and is mounted to the outer peripheral surface of the ball screw nut 23 while the semicircular members are combined in an annular form. Further, a pressing collar 48 and a snap ring 49 are mounted to the outer peripheral surface of the ball screw nut 23. The pressing collar 48 is configured to hold the restriction member 47. The snap ring 49 is configured to prevent the pressing collar 48 from falling off in the axial direction.

On the transmission gear case 29 side of the bearing case 41, there is formed a protruding portion 41a configured to be fitted to the fitting recessed portion 29f of the transmission gear case 29. Moreover, on the transmission gear case 29 side of the bearing case 41, there is formed a gear boss accommodating portion 41b configured to accommodate a part of the gear boss 32 projecting from the transmission gear case 29 under a state in which the bearing case 41 is fitted to the transmission gear case 29. On an inner peripheral surface of the gear boss accommodating portion 41b, there is formed a bearing mounting surface 41c which is configured to mount the rolling bearing 34 configured to support the gear boss 32.

On an opposite side of the bearing case 41 with respect to the transmission gear case 29 side, the shaft case 50 having a bottomed tubular shape configured to accommodate a rear end portion side (right end portion side in FIG. 1) of the ball screw shaft 24 is formed so as to be capable of being fastened through bolts 51 (see FIG. 3). In an abutment surface of the shaft case 50 against the bearing case 41, there is formed a mounting groove 50a configured to mount an O ring 52. Moreover, in an inner peripheral surface of the shaft case 50, guide grooves 50b into which both end portions of the pin 27 provided on the ball screw shaft 24 are formed so as to extend in the axial direction. A guide collar 53 is rotatably mounted to each of the both end portions of the pin 27. When the ball screw shaft 24 advances and retreats in the axial direction, the guide collars 53 move along the guide grooves 50b while rotating.

As illustrated in FIG. 3, bolt insertion holes 11a, 17e, 29i, and 41d for inserting bolts 54 configured to assemble and fasten the motor case 11, the speed reduction gear case 17, the transmission gear case 29, and the bearing case 41 are formed in outer peripheries of the respective cases in a radial direction. Further, through holes 29j and 41e configured to mount the assembled electric actuator 1 to an installation location are formed in the outer peripheries in the radial direction of both of the transmission gear case 29 and the bearing case 41.

Figure 5:
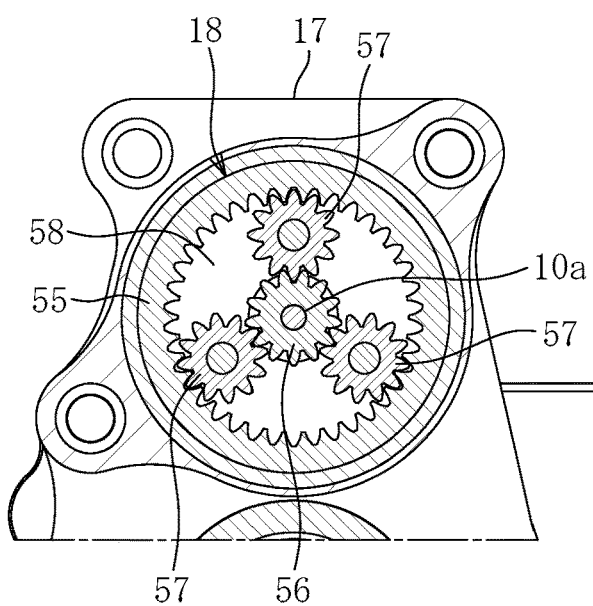
FIG. 5 is a transverse sectional view as seen in a direction indicated by the arrows of the line A-A in FIG. 1.
Figure 6:
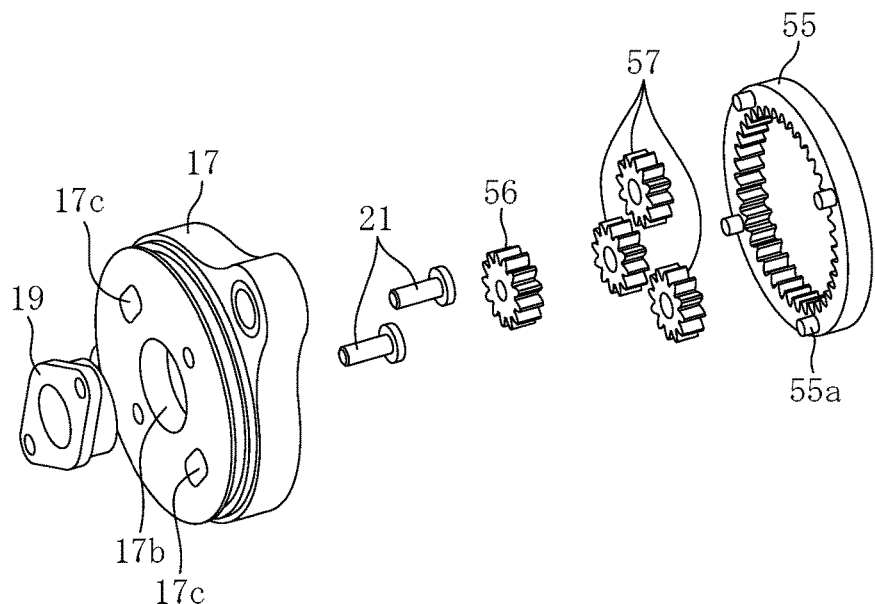
FIG. 6 is an exploded perspective view of a speed reduction mechanism part.

Now, description is made of the planetary-gear speed reduction mechanism 18 with reference to FIG. 1, FIG. 5, and FIG. 6.

FIG. 5 is a transverse sectional view as seen in a direction indicated by the arrows of the line A-A in FIG. 1. FIG. 6 is an exploded perspective view of the planetary-gear speed reduction mechanism 18.

The planetary-gear speed reduction mechanism 18 comprises a ring gear 55, a sun gear 56, a plurality of planetary gears 57, a planetary gear carrier 58 (see FIG. 1), and planetary gear holders 59 (see FIG. 1). The ring gear 55 comprises a plurality of protrusions 55a projecting in the axial direction. Engagement recessed portions 17f as many as the protrusions 55a are formed in the accommodating recessed portion 17a of the speed reduction gear case 17 (see FIG. 1). Through assembly of the protrusions 55a of the ring gear 55 to the engagement recessed portions 17f of the speed reduction gear case 17 while the protrusions 55a and the engagement recessed portions 17f are in phase, the ring gear 55 is accommodated in the speed reduction gear case 17 while the rotation of the ring gear 55 is stopped.

The sun gear 56 is arranged at the center of the ring gear 55. The output shaft 10a of the driving motor 10 is press-fitted to the sun gear 56. Moreover, the respective planetary gears 57 are arranged between the ring gear 55 and the sun gear 56 so as to mesh with the ring gear 55 and the sun gear 56. The respective planetary gears 57 are rotatably supported by the planetary gear carrier 58 and the planetary gear holders 59. The planetary gear carrier 58 comprises a cylindrical portion 58a at its center portion. The cylindrical portion 58a is press-fitted between an outer peripheral surface of the gear boss 32 and an inner peripheral surface of the rolling bearing 33 (see FIG. 1). An annular collar 75 is mounted between an inner peripheral surface of the another rolling bearing 34 and the outer peripheral surface of the gear boss 32.

In the planetary-gear speed reduction mechanism 18 having the configuration described above, when the driving motor 10 performs the rotational drive, the sun gear 56 coupled to the output shaft 10a of the driving motor 10 rotates, and, along with this rotation, the respective planetary gears 57 revolve along the ring gear 55 while rotating. Then, the planetary gear carrier 58 is rotated by the revolving motion of the planetary gears 57. With this, the rotation of the driving motor 10 is reduced in speed and transmitted to the drive gear 30, and a rotation torque increases. When the driving force is transmitted through the planetary-gear speed reduction mechanism 18 in such a manner, a high output of the ball screw shaft 24 can be obtained, and the driving motor 10 can be downsized.

Figure 7:
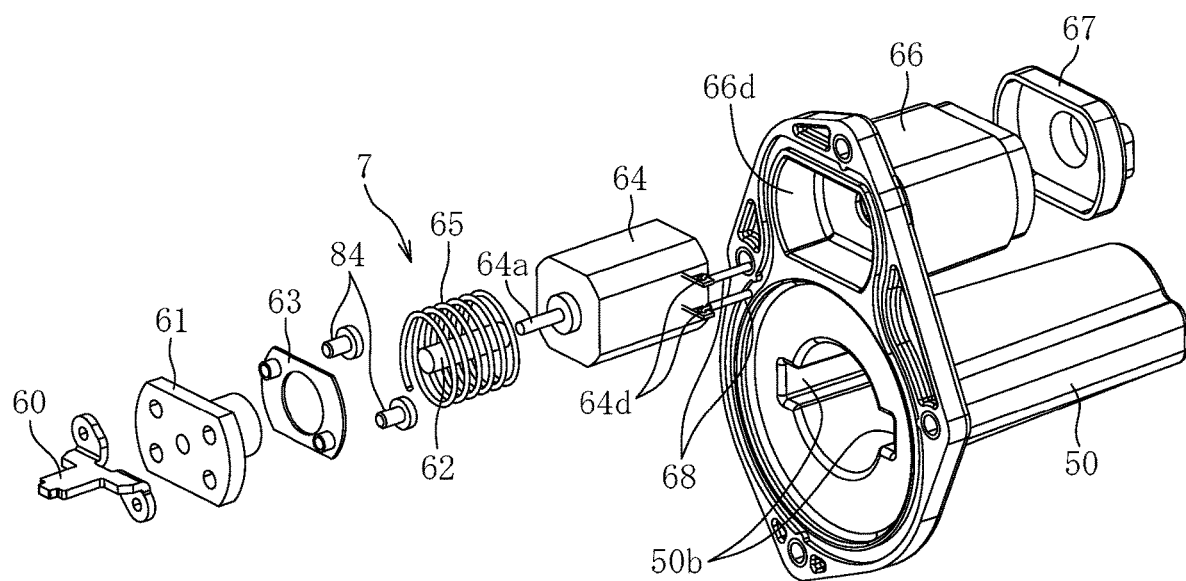
FIG. 7 is an exploded perspective view of a shaft case and a lock mechanism part mounted thereto.
Figure 8:
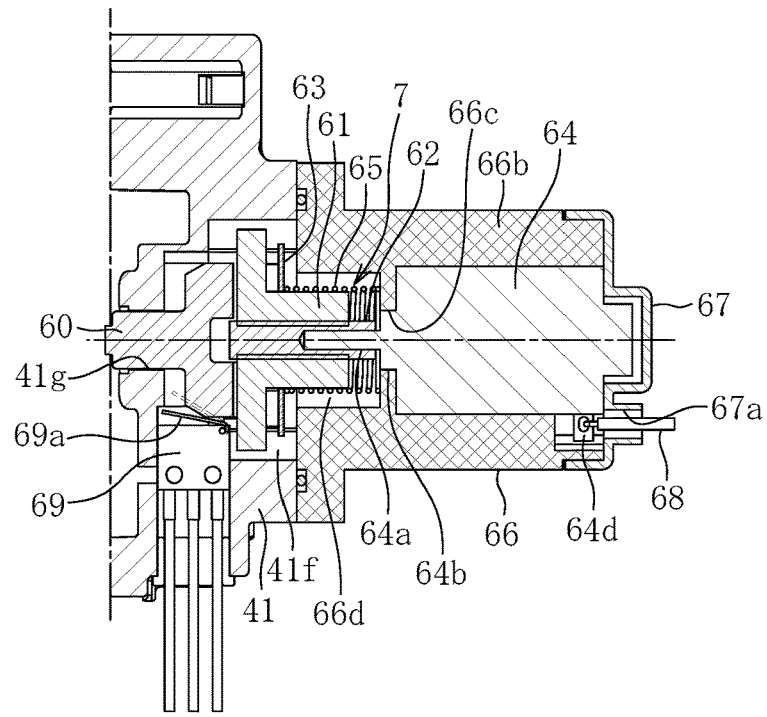
FIG. 8 is a transverse sectional view as seen in a direction indicated by the arrows of the line B-B in FIG. 1.

Next, description is made of the lock mechanism part 7 with reference to FIG. 1, FIG. 7, and FIG. 8. FIG. 7 is an exploded perspective view of the shaft case 50 and the lock mechanism part 7 mounted thereto. FIG. 8 is a transverse sectional view as seen in a direction indicated by the arrows of the line B-B in FIG. 1.

The lock mechanism part 7 mainly comprises a lock member 60, a sliding screw nut 61, a sliding screw shaft 62, a lock-member fixation plate 63, a locking motor (DC motor) 64, and a spring 65. When the lock mechanism part 7 is to be assembled, first, the lock member 60 is fastened to the sliding screw nut 61 through intermediation of the lock-member fixation plate 63 with bolts 84 (see FIG. 7). Next, the locking motor 64 is accommodated in a holder portion 66 formed in the shaft case 50. The sliding screw shaft 62 is then mounted to an output shaft 64a of the locking motor 64 projecting from the holder portion 66. Then, the spring 65 is arranged on an outer periphery of the sliding screw shaft 62, and the sliding screw nut 61 having the lock member 60 mounted thereto is mounted to the sliding screw shaft 62 through thread engagement. In such a manner, the assembly of the lock mechanism part 7 is completed.

The holder portion 66 is formed into a bottomed tubular shape, and a cap 67 is mounted on an opposite side of a bottom portion 66a thereof. The locking motor 64 is held in abutment against the bottom portion 66a of the holder portion 66 and an inner surface of the cap 67 under a state in which the locking motor 64 is inserted into the holder portion 66 and the cap 67 is mounted. Moreover, under this state, a projection 64b of the locking motor 64 on an output side (left side in FIG. 1) is fitted to a fitting hole 66c formed in the bottom portion 66a of the holder portion 66. Both of an outer peripheral surface of the main body of the locking motor 64 and an inner peripheral surface of a peripheral wall portion 66b of the holder portion 66 are formed into the same shapes, which are not cylindrical. Thus, the rotation of the locking motor 64 is restricted through the insertion of the locking motor 64 into the peripheral wall portion 66b of the holder portion 66. Through accommodation of the locking motor 64 in the holder portion 66 in such a manner, the locking motor 64 is held by the holder portion 66, and the entire lock mechanism part 7 is held. Moreover, the cap 67 has a hole portion 67a configured to insert cables 68 connected to motor terminals 64d of the locking motor 64 (see FIG. 8).

Figure 9:
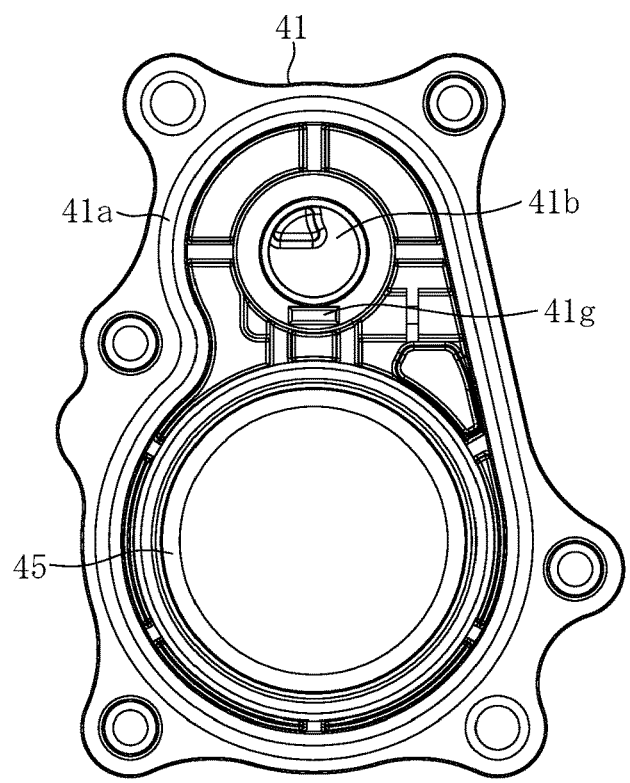
FIG. 9 is a front view of a bearing case as seen from the left side of FIG. 1.
Figure 10:
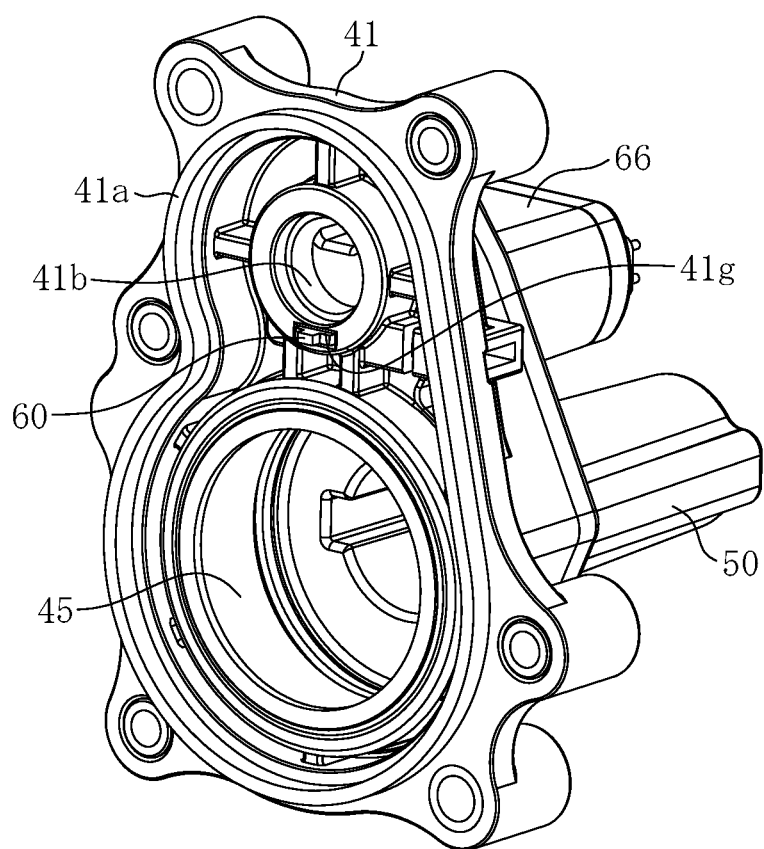
FIG. 10 is a perspective view for illustrating a state in which a distal end portion of a lock member projects from a through hole.

Lock-mechanism accommodating recessed portions 66d and 41f are respectively formed in a portion of the shaft case 50 at which the holder portion 66 is formed and a portion of the bearing case 41 opposed thereto. A through hole 41g is formed in the lock-mechanism accommodating recessed portion 41f on the bearing case 41 side. As illustrated in FIG. 1, a part of the output shaft 64a of the locking motor 64, the sliding screw shaft 62, the sliding screw nut 61, the lock-member fixation plate 63, the spring 65, and the lock member 60, which project from the holder portion 66, are accommodated in the lock-mechanism accommodating recessed portions 66d and 41f, and a distal end portion side of the lock member 60 having a flat plate shape is inserted into the through hole 41g under a state in which the shaft case 50 is mounted to the bearing case 41. The through hole 41g is formed of a hole having a rectangular cross section approximately the same in size and the same in shape as the distal end portion side of the lock member 60 (see FIG. 9 and FIG. 10). Moreover, the spring 65 is compressed in the axial direction between the bottom portion 66a of the holder portion 66 and the lock-member fixation plate 63 under the state in which the shaft case 50 is mounted to the bearing case 41. The lock member 60 is always urged in an advancing direction (left side in FIG. 1) by the compressed spring 65.

Figure 11:
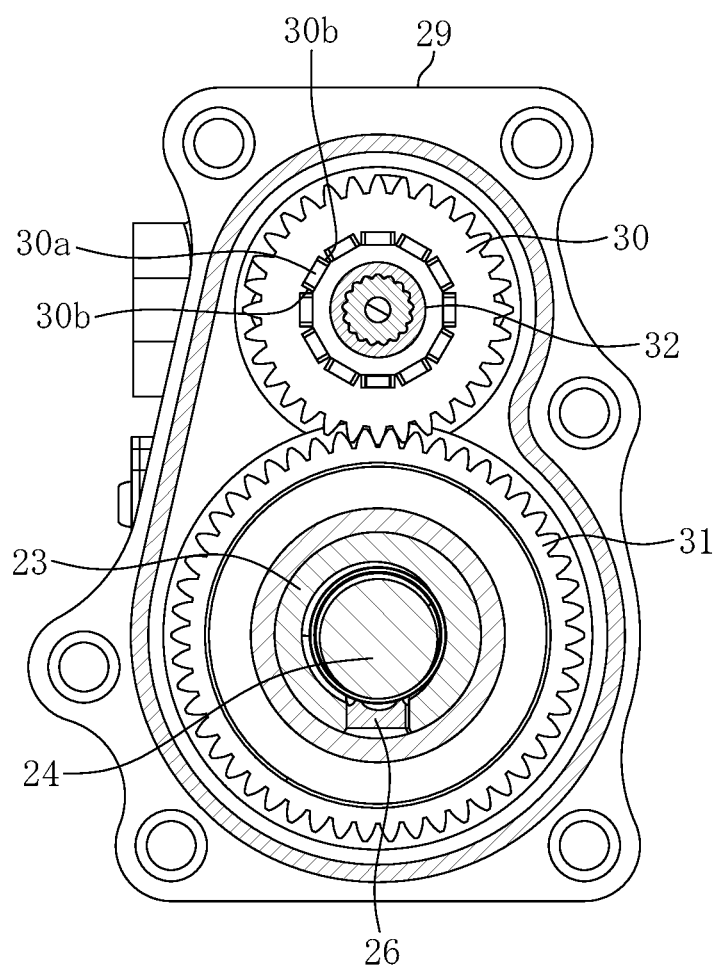
FIG. 11 is a transverse sectional view as seen in a direction indicated by the arrows of the line C-C in FIG. 1.

The drive gear 30 is arranged in the advancing direction of the lock member 60. The drive gear 30 has engagement holes 30a with which the distal end portion of the lock member 60 can be engaged. As illustrated in FIG. 11, which is a transverse sectional view as seen in a direction indicated by the arrows of the line C-C in FIG. 1, the plurality of engagement holes 30a are formed in a circumferential direction of the drive gear 30. The rotation of the drive gear 30 is restricted through the engagement of the lock member 60 with any one of those engagement holes 30a. Moreover, a tilted surface 30b is formed at an entrance portion of each of the engagement holes 30a, and the lock member 60 is thus smoothly inserted into the engagement hole 30a along the tilted surface 30b.

A lock sensor 69 configured to detect a locking state is mounted to the bearing case 41 (see FIG. 8). The lock sensor 69 comprises a contact element 69a formed of an elastic member such as a plate spring. When the lock member 60 advances to be engaged with the engagement hole 30a (brought into a locking state), the lock member 60 pushes the contact element 69a so that the lock sensor 69 detects the locking state.

Now, description is made of an operation of the lock mechanism part 7.

When power is not supplied to the locking motor 64, the lock member 60 is held at the advanced position by the spring 65, and is in the locking state in which the distal end portion of the lock member 60 is engaged with the engagement hole 30a of the drive gear 30. When the power is supplied to the driving motor 10 in order to start the driving of the ball screw shaft 24 in this state, the power is also supplied to the locking motor 64, and the locking motor 64 drives the lock member 60 in a retreating direction. With this, the sliding screw shaft 62 rotates. Meanwhile, the rotation of the sliding screw nut 61 is restricted through the insertion of the flat-plate-shaped distal end portion of the lock member 60 into the through hole 41g having a rectangular cross section. Thus, when the sliding screw shaft 62 rotates, the sliding screw nut 61 retreats against the urging force of the spring 65, and the lock member 60 retreats integrally with the sliding screw nut 61. With this, the distal end portion of the lock member 60 is disengaged from the engagement hole 30a of the drive gear 30, and the locking state is thus released. In this way, while the ball screw shaft 24 is being driven, the lock member 60 is held at the retreated position, and the drive gear 30 is thus held in the unlocked state (unlocking state).

After that, when the supply of power to the driving motor 10 is shut off and the drive of the ball screw shaft 24 is thus stopped, the supply of power to the locking motor 64 is also shut off. With this, the driving force for causing the lock member 60 to retreat is no longer generated, and the lock member 60 is thus pushed to move in the advancing direction by the spring 65. Then, the locking state is brought about through the engagement of the distal end portion of the lock member 60 with the engagement hole 30a of the drive gear 30, thereby restricting the rotation of the drive gear 30.

Through restriction of the rotation of the drive gear 30 by the lock member 60 in such a manner, the ball screw shaft 24 is held in the state in which the ball screw shaft 24 does not retreat. With this, even when an external force is input from the object device to be operated to the ball screw shaft 24 side, a position of the ball screw shaft 24 can be held at a predetermined position. This configuration is particularly preferred for a case in which the electric actuator is applied to an application that requires holding a position of the ball screw shaft 24.

In this embodiment, the lock member 60 is caused to retreat by driving the locking motor 64. Conversely, the locking motor 64 may be driven to cause the lock member 60 to advance. Moreover, the lock member 60 may be caused to advance and retreat by rotating the locking motor 64 forward and backward.

A stroke sensor 70 configured to detect a stroke of the ball screw shaft 24 is mounted to the electric actuator 1 of this embodiment (see FIG. 2 and FIG. 3). The stroke sensor 70 is mounted to a sensor base 71. The sensor base 71 is fastened and fixed through bolts 72 to a sensor case 76 formed on an outer peripheral surface between the motor case 11 and the boot cover 39. Meanwhile, a permanent magnet 73 serving as a sensor target is mounted to an outer peripheral surface of a portion of the ball screw shaft 24 covered with the boot 36 (see FIG. 1). In this embodiment, the permanent magnet 73 is mounted to the ball screw shaft 24 through intermediation of a cylindrical elastic member 74 cut apart at a portion in a circumferential direction. When the ball screw shaft 24 advances and retreats, a position of the magnet 73 with respect to the stroke sensor 70 changes, and the position of the ball screw shaft 24 in the axial direction can be recognized through the stroke sensor 70 detecting a change in direction of line of magnetic force that changes along with the change in position of the magnet 73.

Figure 12:
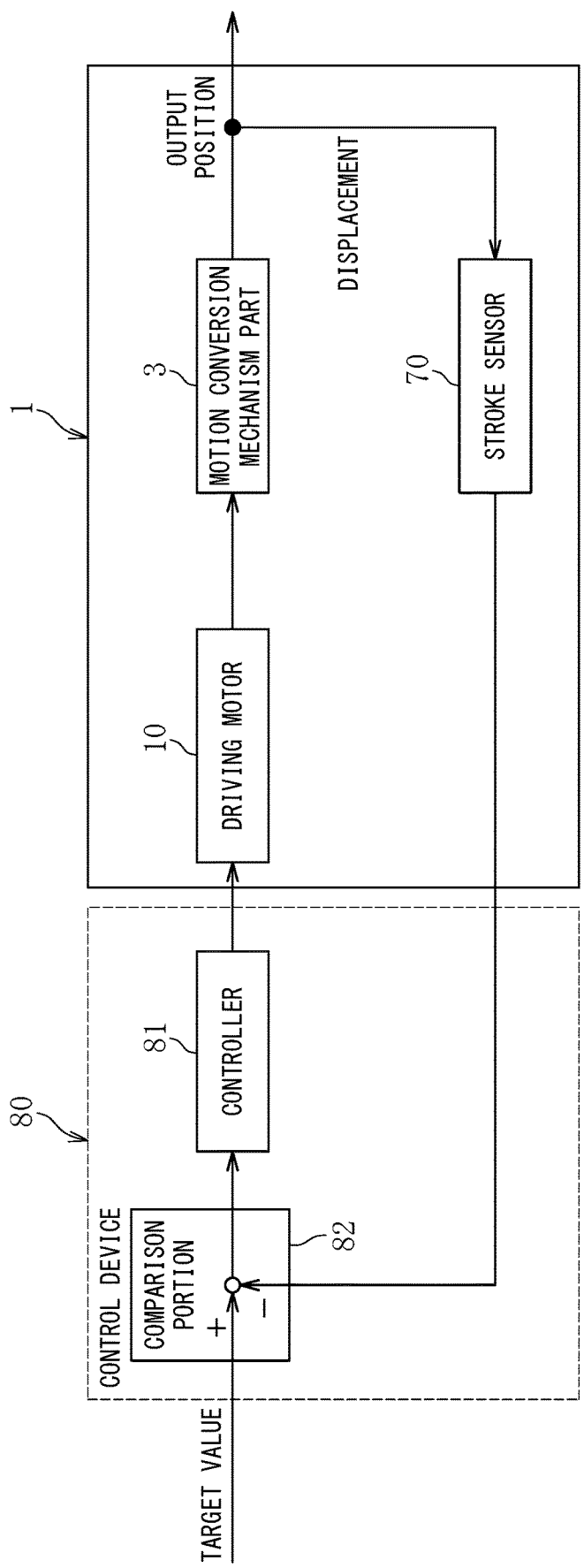
FIG. 12 is a control block diagram of the electric actuator.

Next, with reference to FIG. 12, description is made of feedback control using the stroke sensor 70.

As illustrated in FIG. 12, when a target value is transmitted to a control device 80, a control signal is transmitted from a controller 81 of the control device 80 to the driving motor 10. The target value is, for example, a stroke value calculated by an ECU provided at an upper position of a vehicle based on an operation amount when the operation amount is input to the ECU.

When the driving motor 10 receives the control signal, the driving motor 10 starts the rotational drive, and the driving force thereof is transmitted to the ball screw shaft 24 through intermediation of the planetary-gear speed reduction mechanism 18, the drive gear 30, the driven gear 31, and the ball screw nut 23, and the ball screw shaft 24 thus advances.

With this, the object device to be operated arranged on the distal end portion side (actuator head side) of the ball screw shaft 24 is operated.

At this time, the stroke value (position in the axial direction) of the ball screw shaft 24 is detected by the stroke sensor 70. The detection value detected by the stroke sensor 70 is transmitted to a comparison portion 82 of the control device 80, and a difference between the detection value and the target value is calculated. Then, the driving motor 10 is driven until the detection value matches the target value. When the electric actuator 1 of this embodiment is applied to, for example, a shift-by-wire system, a shift position can reliably be controlled by feeding back the stroke value detected by the stroke sensor 70 to control the position of the ball screw shaft 24 in such a manner.

Figure 13:
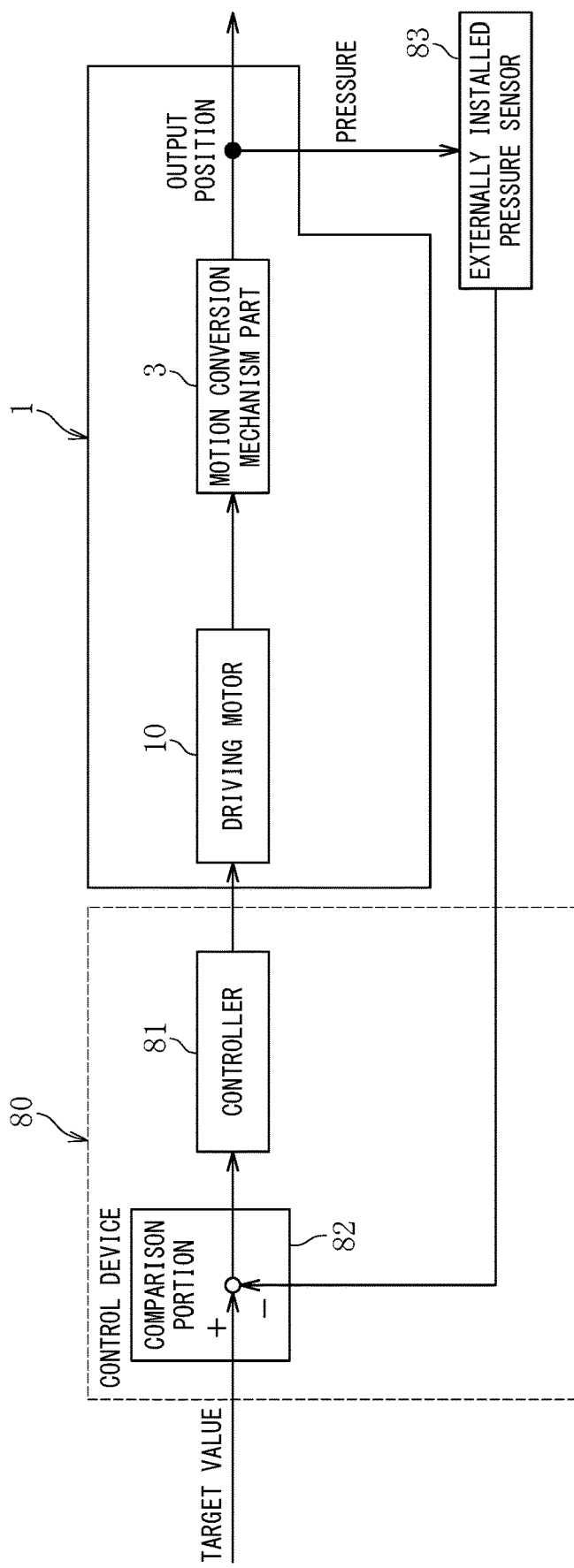
FIG. 13 is a control block diagram of the electric actuator.

Next, with reference to FIG. 13, description is made of feedback control in a case in which a pressure sensor 83 is used in place of the stroke sensor 70.

As illustrated in FIG. 13, in this case, the pressure sensor 83 is provided for the object device to be operated. When the operation amount is input to the ECU provided at the upper position of the vehicle, the ECU calculates a required target value (pressure command value). When the target value is transmitted to the control device 80, and the control signal is transmitted from the controller 81 to the driving motor 10, the driving motor 10 starts the rotational drive. With this, the ball screw shaft 24 advances, and the object device to be operated arranged on the distal end portion side (actuator head side) of the ball screw shaft 24 is operated to pressurize.

An operation pressure of the ball screw shaft 24 at this time is detected by the pressure sensor 83, and the position of the ball screw shaft 24 is subjected to the feedback control based on the detection value and the target value as in the case of the use of the stroke sensor 70. When the electric actuator 1 of this embodiment is applied to, for example, a brake-by-wire system, a hydraulic pressure of a brake can reliably be controlled by feeding back the pressure value detected by the pressure sensor 83 to control the position of the ball screw shaft 24 in such a manner.

The configuration and the operation of the electric actuator 1 of this embodiment are as described above. Now, description is made of components suitable for downsizing relating to the electric actuator 1 of this embodiment.

As illustrated in FIG. 1, in this embodiment, the lock mechanism part 7 is arranged on the right side of FIG. 1 with respect to the drive gear 30, in other words, on an opposite side of the drive part 2. Thus, through the arrangement of the lock mechanism part 7 on the opposite side of the drive part 2, interference with the drive part 2 does not need to be considered on the side on which the lock mechanism part 7 is arranged. When the lock mechanism part 7 is arranged on the same side as the drive part 2, the lock mechanism part 7 needs to be displaced in the axial direction with respect to the drive part 2, or displaced in the radial direction or the circumferential direction orthogonal to the axial direction in order to prevent the interference between the drive part 2 and the lock mechanism part 7, which leads to an increase in size of the electric actuator 1 in the axial direction or the radial direction. In contrast, in this embodiment, as illustrated in FIG. 1, the lock mechanism part 7 can be arranged directly above the motion conversion mechanism part 3 similarly to the drive part 2 (at a position the same in phase as the drive part 2 in the circumferential direction of the ball screw 22), and an increase in size of the electric actuator 1 can thus be prevented. Moreover, a configuration excellent in weight balance is provided.

Further, in this embodiment, the lock mechanism part 7 is arranged on a bottom side of FIG. 1 with respect to a rotation center line X of the drive gear 30, in other words, on the motion conversion mechanism part 3 side in the radial direction. Thus, through the arrangement of the lock mechanism part 7 on the motion conversion mechanism part 3 side with respect to the rotation center line X of the drive gear 30, the lock mechanism part 7 can be arranged close to the motion conversion mechanism part 3 in the radial direction (direction orthogonal to the linear motion direction). Similarly, a portion configured to accommodate the ball screw shaft 24 and the portion (holder portion 66) configured to accommodate the lock mechanism part 7 in the shaft case 50 can be arranged so as to be close to each other. As a result, the shaft case 50 is downsized, and downsizing of the electric actuator 1 in the vertical direction can be achieved.

The above description "the lock mechanism part 7 is arranged on the motion conversion mechanism part 3 side with respect to the rotation center line X of the drive gear 30" means that more than a half of a vertical dimension (dimension in the up-and-down direction in FIG. 1) of the lock mechanism 7 is arranged on the motion conversion mechanism part 3 side with respect to the rotation center line X of the drive gear 30. In other words, the description may correspond to a case in which the entire lock mechanism part 7 is arranged on the motion conversion mechanism part 3 side with respect to the rotation center line X of the drive gear 30 and to a case in which a part (portion equal to or less than a half of the vertical dimension) of the lock mechanism 7 is arranged on the opposite side of the motion conversion mechanism part 3 with respect to the rotation center line X of the drive gear 30.

Moreover, as illustrated in FIG. 1, in this embodiment, the lock mechanism part 7 is configured to be engaged with the drive gear 30 on the motion conversion mechanism part 3 side with respect to the rotation center line X. With such a configuration, the arrangement of the lock mechanism part 7 close to the motion conversion mechanism part 3 is promoted, and the achievement of downsizing of the electric actuator 1 in the vertical direction is thus promoted.

Further, in this embodiment, the engagement holes 30a are formed in a side surface of the drive gear 30 crossing the axial direction, and the lock mechanism part 7 is configured to be engaged with the engagement hole 30a. With this, the lock mechanism part 7 is not engaged with teeth of the drive gear 30. Thus, application of a load on the teeth by the engagement can be prevented, and reliability increases.

In this embodiment, although the rotation is transmitted from the drive gear 30 to the driven gear 31 at a constant speed, the rotation may be transmitted from the drive gear 30 to the driven gear 31 while the speed of the rotation is reduced. In this case, the drive gear 30 is high in rotation speed and low in rotation torque compared with the driven gear 31. Thus, when not the driven gear 31 high in rotation torque but the drive gear 30 low in rotation torque is used as the gear to be engaged with the lock mechanism part 7, a load on the lock mechanism part 7 during the engagement can thus be reduced. Moreover, in this case, when the drive gear 30 having the higher rotation speed is used as the gear to be engaged with the lock mechanism part 7, the positioning can finely be carried out compared with a case in which the driven gear 31 having the reduced rotation speed is used as the gear to be engaged with the lock mechanism part 7. As a result, a position accuracy of stopping the motion conversion mechanism part 3 increases.

Moreover, in this embodiment, the sliding screw device comprising the sliding screw nut 61 and the sliding screw shaft 62 is used as the mechanism configured to convert the rotary motion of the locking motor 64 into the linear motion. In such a manner, as a result of employing the sliding screw device, the linear motion can be achieved through the simple configuration having a small number of parts in the configuration of employing the rotary motor as the driving source. Thus, further downsizing can be achieved.

As described above, when the sliding screw device is used, the configuration to restrict the rotation of the member of the sliding screw device performing the linear motion is required. However, in this embodiment, the through hole 41g having the rectangular cross section is formed in the baring case 41, and the lock member 60 having the flat plate shape is inserted into the through hole 41g, thereby restricting the rotation of the member (sliding screw nut 61) of the sliding screw device performing the linear motion. In such a manner, the bearing case 41, which is a part of the actuator case, has the function as the rotation restriction part. As a result, it is not required to independently provide a member configured to restrict the rotation of the sliding screw nut 61, which is advantageous for the downsizing.

As another configuration of this embodiment, a projection may be formed on an outer peripheral surface of the sliding screw nut 61, and the rotation of the sliding screw nut 61 may be restricted by bringing the projection into abutment against an inner surface of the bearing case 41. When the portion configured to restrict the rotation of the sliding screw nut 61 is far in the radial direction from the output shaft 64a of the locking motor 64, a moment received by the portion configured to restrict the rotation increases, and it is determined that a resistance against the linear motion of the sliding screw nut 61 increases. Therefore, it is desired that the portion configured to restrict the rotation be at a position as close as possible to the output shaft 64a of the locking motor 64 in the radial direction. In this respect, in this embodiment, the distal end portion side of the lock member 60 is arranged coaxially with the output shaft 64a of the locking motor 64 (see FIG. 1 and FIG. 8). With this configuration, the rotation can be restricted at the position close to the output shaft 64a in the radial direction, and the resistance against the sliding screw nut 61 can be reduced. As a result, action performance of the lock member 60 increases, and reliability of the electric actuator increases.

Now, description is made of another embodiment of the present invention. A portion other than that described below basically has the same configuration as that of the above-mentioned embodiment, and description of the same portion is thus omitted.

Also in this embodiment, similarly to the embodiment described above, the lock sensor 69 configured to detect the advanced and retreated positions of the lock member 60 in order to recognize whether or not the locking state is brought about is mounted to the bearing case 41 (see FIG. 8). The lock sensor 69 comprises the contact element 69a formed of an elastic member such as a plate spring. When the lock member 60 advances, the lock member 60 pushes the contact element 69a, and the position of the lock member 60 is thus detected.

Now, description is made of an operation of the lock mechanism part 7.

When power is not supplied to the locking motor 64, the lock member 60 is maintained at the locking position having reached after being advanced by the spring 65, and is in the locking state in which the distal end portion of the lock member 60 is engaged with the engagement hole 30a of the drive gear 30. When the locking motor 64 rotates backward (rotates in a direction in which the lock member 60 retreats)

from this state, the sliding screw shaft 62 rotates along with this backward rotation. At this time, the rotation of the sliding screw nut 61 is restricted through the insertion of the distal end portion in the flat plate shape of the lock member 60 into the through hole 41*g* having the rectangular cross section. Thus, when the sliding screw shaft 62 rotates, the sliding screw nut 61 retreats against the urging force of the spring 65, and the lock member 60 also retreats integrally with the sliding screw nut 61. With this, the distal end portion of the lock member 60 is disengaged from the engagement hole 30*a* of the drive gear 30, and the lock member 60 is brought into an unlocking state of being maintained at an unlocking position.

Then, the linear motion of the ball screw 22 of the electric actuator stops. When the lock member 60 is again brought into the locking state, the lock member 60 is advanced by forward rotation of the locking motor 64. Then, when the lock member 60 advances, the distal end portion of the lock member 60 is inserted into the engagement hole 30*a* of the drive gear 30, and the locking state in which the rotation of the drive gear 30 is restricted through the engagement with the lock member 60 is brought about.

In such a manner, through restriction of the rotation of the drive gear 30 by the lock member 60, the ball screw shaft 24 is maintained in the state in which the ball screw shaft 24 does not advance or retreat. With this, even when an external force is input from the side of the object device to be operated to the ball screw shaft 24 side, a position of the ball screw shaft 24 can be held at a predetermined position. This configuration is particularly preferred for a case in which the electric actuator is applied to an application that requires holding a position of the ball screw shaft 24. Moreover, as in this embodiment, when not the tooth surfaces of the drive gear 30 but the engagement holes 30*a* formed in the side surface crossing the axial direction are used as the engagement portion of the drive gear 30 with which the lock member 60 is engaged, occurrence of wears and deformations of the tooth surfaces can be prevented, and controllability of the electric actuator can be maintained excellent.

In this embodiment, the lock member 60 is advanced and retreated through the drive of the locking motor 64. However, when the lock member 60 is advanced, without driving the locking motor 64, the lock member 60 may be advanced only through the urging force of the spring 65.

Incidentally, in the electric actuator of this embodiment, in a case in which the lock member 60 is brought into the locking state, when the phases of the engagement hole 30*a* and the lock member 60 in the circumferential direction are displaced from each other, the lock member 60 may not be inserted into the engagement hole 30*a*. In order to reliably insert the lock member 60 into the engagement hole 30*a*, it is desired that the phase of the engagement hole 30*a* in the circumferential direction be matched with the position of the lock member 60. However, in this embodiment, the inexpensive DC motor (brushed motor) is used as the driving motor 10, and means for detecting a rotation angle of the driving motor 10 is not provided. As a result, the phase of the engagement hole 30*a* cannot be matched through use of such rotation angle detection means. Thus, in the electric actuator of this embodiment, the following countermeasures are taken.

Figure 14:
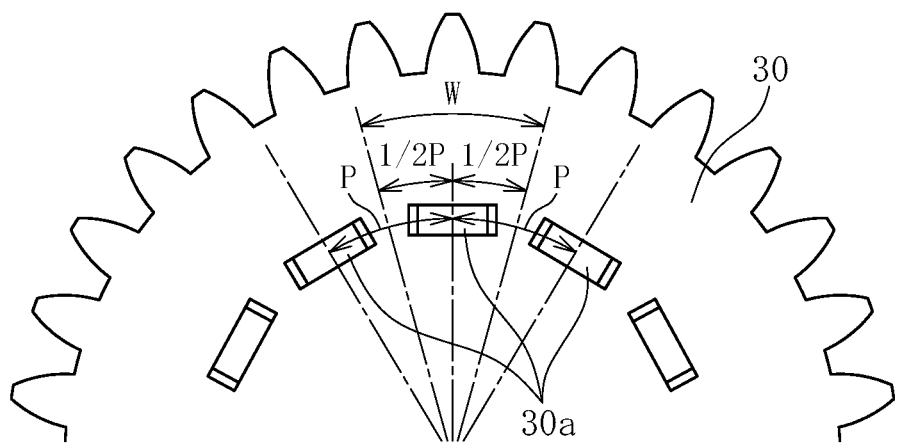
FIG. 14 is an explanatory view for illustrating a swing width of a drive gear.

In this embodiment, when the lock member 60 is inserted into the engagement hole 30*a*, the drive gear 30 having the engagement holes 30*a* is swung, thereby matching the phase of the engagement hole 30*a* with the lock member 60. In other words, when the driving by the driving motor 10 is stopped and then the linear motion of the ball screw 22 is finished, while the lock member 60 is being advanced to be brought into the locking state, the driving motor 10 is caused to rotationally drive alternately in the forward and backward directions, thereby swinging the drive gear 30 in one direction and an opposite direction thereof in the circumferential direction. As illustrated in FIG. 14, a swing width W of the drive gear 30 on this occasion is set so that the drive gear 30 is swung by a width corresponding to an amount of a half pitch (½P) of an interval between the engagement holes 30*a* in each of the one direction and the opposite direction thereof in the circumferential direction. For example, when twelve engagement holes 30*a* are formed at intervals of 30° in the circumferential direction, the swing width W of the drive gear 30 is 30° in total so that the drive gear 30 is swung in each of the one direction and the opposite direction thereof in the circumferential direction by 15° corresponding to the amount of the half pitch (½P) of the interval between the engagement holes 30*a*.

When the phase of the engagement hole 30*a* in the circumferential direction is matched with the position of the lock member 60 through the swing of the drive gear 30, the lock member 60 advances, and the distal end portion thereof is inserted into the engagement hole 30*a*. Then, by stopping the advance of the lock member 60, and also stopping the swing of the drive gear 30 under a state in which the distal end portion of the lock member 60 is completely inserted into the engagement hole 30*a*, the lock member 60 is brought into and maintained in the locking state in which the lock member 30 can be engaged with the engagement hole 30*a*.

In such a manner, with the present invention, even in a configuration of employing the inexpensive motor such as a DC motor (brushed motor) that cannot allow detection of the rotation angle, the drive gear 30 is swung to match the phase of the engagement hole 30*a* with the lock member 60, thereby being capable of inserting the lock member 60 into the engagement hole 30*a*. With this, the lock member 60 can reliably be inserted into the engagement hole 30*a*, and the reliability of the device thus increases.

Moreover, in the method of swinging the drive gear 30 for the phase matching, the rotation amount of rotating the drive gear 30 for the phase matching of the engagement hole 30*a* can be suppressed to an amount equal to or less than the half pitch of the interval between the engagement holes 30*a*. Therefore, influence on a stop position in the linear motion direction of the ball screw 22 can be reduced.

Figure 15:
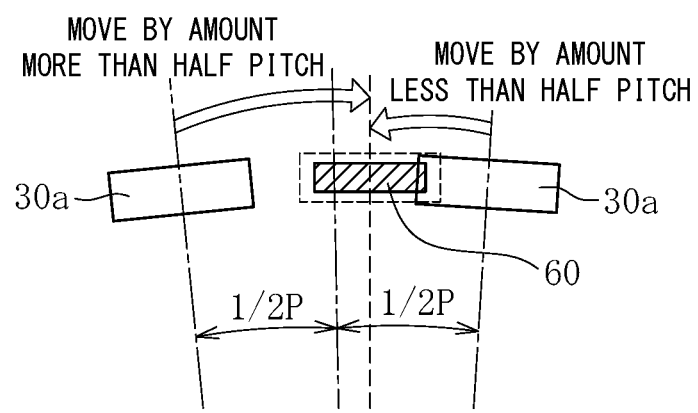
FIG. 15 is a view for illustrating comparison between a rotation amount in a case in which the drive gear is rotated in one direction for phase matching, and a rotation amount in a case in which the drive gear is swung for the phase matching.

For example, as illustrated in FIG. 15, in a case in which the engagement hole 30*a* is displaced with respect to the lock member 60, when the drive gear 30 is rotated in one direction (clockwise in FIG. 15) for the phase matching, the engagement hole 30*a* on the left side of FIG. 15 with respect to the lock member 60 needs to be moved toward the right side of FIG. 15 by an amount more than the half pitch. In contrast, as in the present invention, when the drive gear 30 is swung, the engagement hole 30*a* on the right side of FIG. 15 with respect to the lock member 60 can be moved toward the left side of FIG. 15, and hence the phase can be matched by moving the engagement hole 30*a* on the right side toward the left side of FIG. 15 by an amount less than the half pitch. In such a manner, with the present invention, compared with the case in which the drive gear 30 is rotated in one direction, the rotation amount of the drive gear 30 for the phase matching can be reduced. Thus, the influence on the stop position of the ball screw 22 in the linear motion direction can be reduced, and the stop position in the linear motion direction can accurately be maintained.

Figure 16:
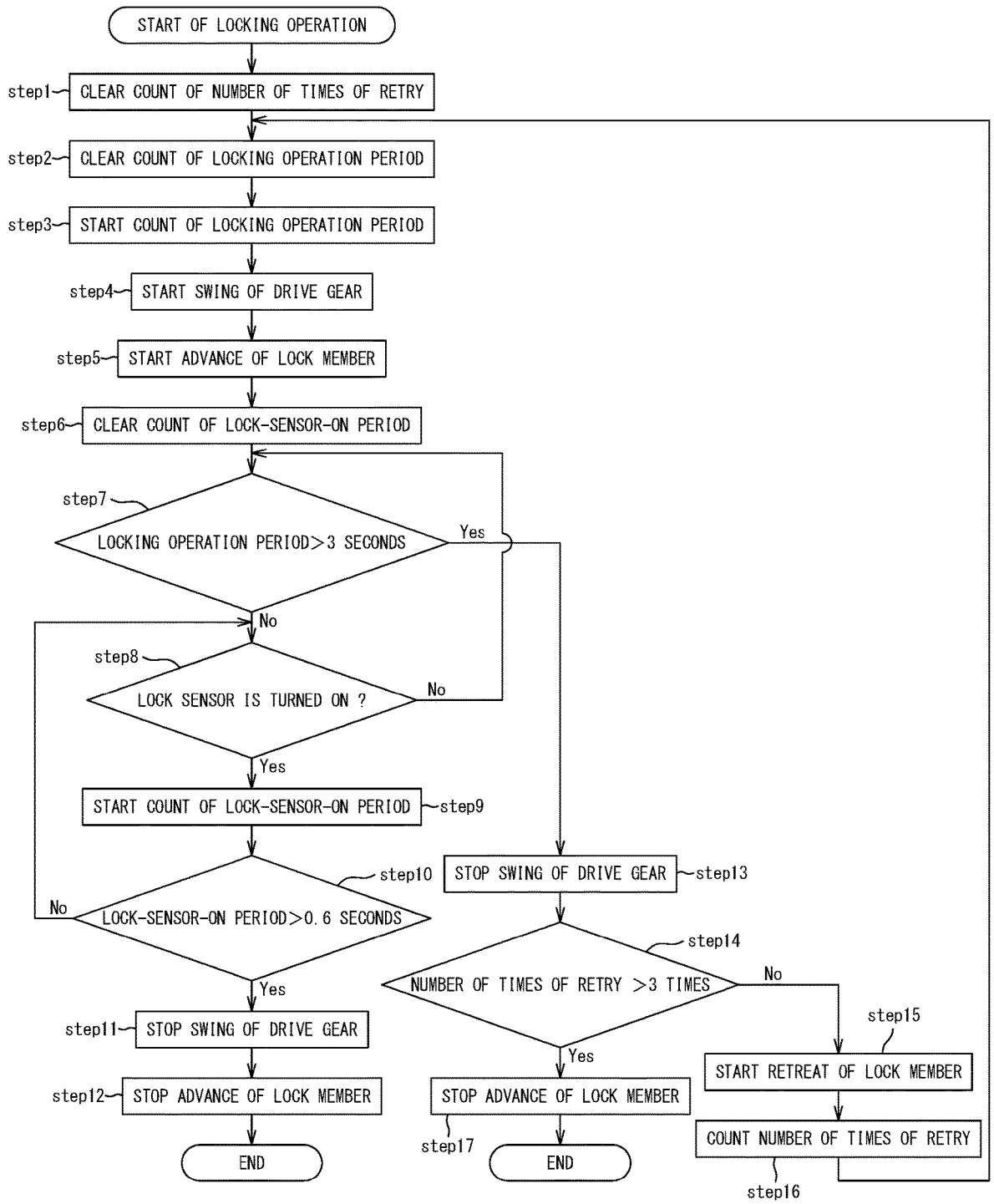
FIG. 16 is a flowchart for illustrating an example of a control flow when a locking operation is performed.

FIG. 16 is a flowchart for illustrating an example of a control flow when the locking operation is performed.

With reference to FIG. 16, description is made of the locking operation.

First, description is made of an overview of the flow illustrated in FIG. 16.

As described above, in this embodiment, when the lock member 60 is advanced, the drive gear 30 is swung to promote the insertion of the lock member 60 into the engagement hole 30a. However, the lock member 60 may not be inserted into the engagement hole 30a due to certain abnormality. Therefore, in the flow illustrated in FIG. 16, the lock sensor 69 detects whether or not the lock member 60 is normally inserted into the engagement hole 30a. Then, when the lock sensor 69 is not turned on (the lock member 60 does not come into contact with the lock sensor 69) even when the lock member 60 is advanced, it is determined that the lock member 60 is not normally inserted into the engagement hole 30a, and a retry operation of once retreating the lock member 60, and again advancing the lock member 60 is carried out. Moreover, in order to measure a timing of transition to the retry operation, a period of the locking operation is counted. Even when the lock sensor 69 is not turned on after a predetermined period, the transition to the retry operation is carried out. Further, the number of times of the retry operation is also counted. Even when the lock sensor 69 is not turned on after the retry operation is carried a predetermined number of times, it is determined that the locking state is not brought about even through further retry operation, and the locking operation is finally finished.

Now, description is made of details of the flow illustrated in FIG. 16.

When a command of starting the locking operation is issued, first, the count of the number of times of the retry is cleared, thereby resetting the count to an initial state (0 times) (step 1). Further, the locking operation period is cleared, thereby resetting the counted period to an initial state (no counted period) (step 2).

Then, the count of the locking operation period is started (step 3), the swing of the drive gear 30 is started (step 4), and the locking motor 64 is rotated forward, thereby starting the advance of the lock member 60 (step 5).

Further, a count of a lock-sensor-on period is cleared, thereby resetting the counted period to an initial state (no counted period) (step 6). The lock-sensor-on period is a period set to prevent a false detection due to chattering (swing between on and off) of a switch when the lock sensor 69 is turned on. In this embodiment, the lock-sensor-on period is set to 0.6 seconds, and the false detection due to the chattering is prevented through waiting for an elapse of 0.6 seconds after the lock sensor 69 is turned on.

Then, determination is made on whether or not the locking operation period is more than three seconds (step 7). When the locking operation period is not more than three seconds, determination is made on whether or not the lock sensor 69 is turned on (step 8).

As a result, when the lock sensor 69 is turned on, the count of the lock-sensor-on period is started in order to prevent the false detection due to the chattering (step 9). Then, determination is made on whether or not the lock-sensor-on period is more than 0.6 seconds (step 10). When the lock sensor 69 has been turned on for more than 0.6 seconds, it is determined that the lock member 60 is inserted into the engagement hole 30a. Thus, the swing of the drive gear 30 is stopped (step 11), the advance of the lock member 60 is stopped (step 12), and the locking operation is finished.

Meanwhile, in the determination of whether the lock sensor 69 is turned on or off (step 8), when the locking operation period is more than three seconds while the lock sensor 69 is not turned on ("Yes" in step 7), it is determined that the lock member 60 has not been capable of being inserted into the engagement hole 30a in the predetermined period. Thus, the swing of the drive gear 30 is once stopped (step 13), and the flow proceeds to the retry operation. On this occasion, the maximum number of times of the retry operation is set to three, and hence determination is made on whether or not the current retry operation to be performed is a fourth operation (step 14). When the number of the times of the retry operation is three or less, the retry operation is performed.

When the retry operation is to be performed, the locking motor 64 is rotated backward, thereby once retreating the lock member 60 (step 15), and the number of times of the retry is counted up (incremented by one) (step 16). Then, the flow proceeds to the operation of clearing the count of the locking operation period (step 2) immediately after the start of the locking operation, and the subsequent operation is performed again. As a result, when the lock member 60 is inserted into the engagement hole 30a until the locking operation period exceeds three seconds ("Yes" in step 10), the swing of the drive gear 30 is stopped as described above (step 11), the advance of the lock member 60 is stopped (step 12), and the locking operation is finished.

Meanwhile, when the lock member 60 is not inserted into the engagement hole 30a after the same retry operation is repeated three times ("Yes" in step 14), it is determined that the lock member 60 cannot be inserted into the engagement hole 30a even through further retry operation. Thus, the advance of the lock member 60 is stopped (step 17), and the operation is finished.

Now, description is made of the unlocking operation.

As described above, in the present invention, the drive gear 30 is swung, thereby promoting the engagement of the lock member 60 with the engagement hole 30a during the locking operation. Further, the drive gear 30 may be swung also during the unlocking operation. The reason for this is that when a load is acting from the drive gear 30 to the lock member 60 in the locking state, the lock member 60 may be less likely disengaged from the engagement hole 30a. Therefore, in this embodiment, the lock member 60 is retreated while the drive gear 30 is being swung in one direction and an opposite direction thereof in the circumferential direction during the unlocking operation, thereby being capable of reliably releasing the locking state.

Figure 17:
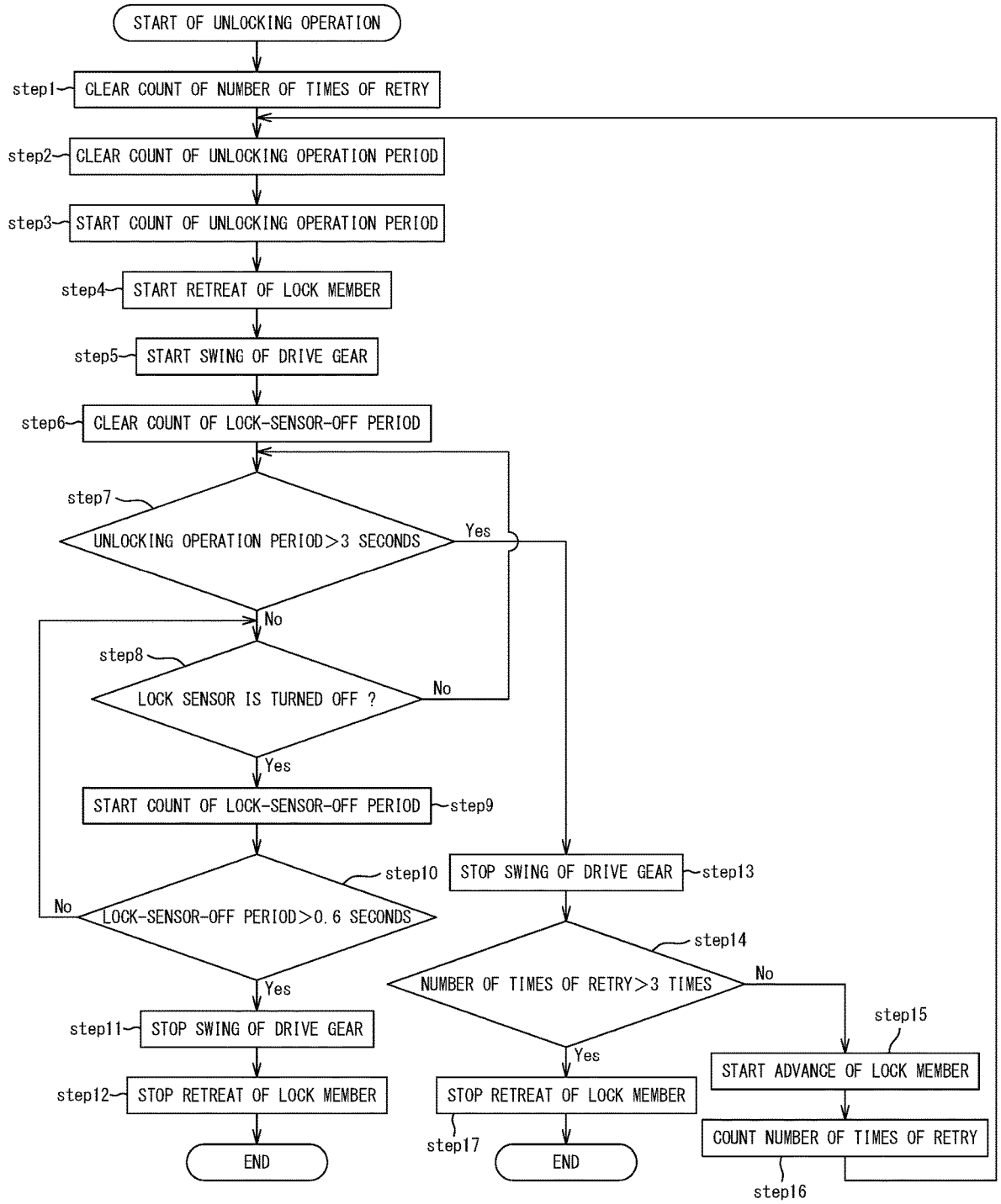
FIG. 17 is a flowchart for illustrating an example of a control flow when an unlocking operation is performed.

FIG. 17 is a flowchart for illustrating an example of a control flow when the unlocking operation is performed.

During the unlocking operation of this embodiment, when the lock member 60 is retreated, the drive gear 30 is swung, thereby promoting the disengagement of the lock member 60 from the engagement hole 30a. However, the lock member 60 may not be disengaged from the engagement hole 30a due to certain abnormality also in the unlocking operation as in the locking operation. Therefore, the lock sensor 69 is configured to detect whether or not the lock member 60 is normally disengaged from the engagement hole 30a. Then, when the lock sensor 69 is not turned off (when the contact of the lock member 60 with the lock sensor 69 is not released) by any chance even when the lock member 60 is retreated, it is determined that the lock member 60 is not normally disengaged from the engagement hole 30a. Thus, a retry operation of advancing lock member 60 once, and again retreating the lock member 60 is performed. Moreover, in order to measure a timing of transition to the retry operation, a period of the unlocking operation is counted. Even when the lock sensor 69 is not turned off after a predetermined period, the transition to the retry operation is performed. Further, the number of times of the retry operation is also counted, and even when the lock sensor 69 is not turned off after the retry operation is carried a predetermined number of times, it is determined that the unlocking state is not brought about even through further retry operation, and the unlocking operation is finally finished. The flow illustrated in FIG. 17 is approximately the same as the flow during the locking operation illustrated in FIG. 16 other than such points that the advance and the retreat of the lock member 60 are reversed, and the ON-state of the lock sensor corresponds to the OFF-state of the lock sensor. Thus, detailed description thereof is omitted.

Figure 18:
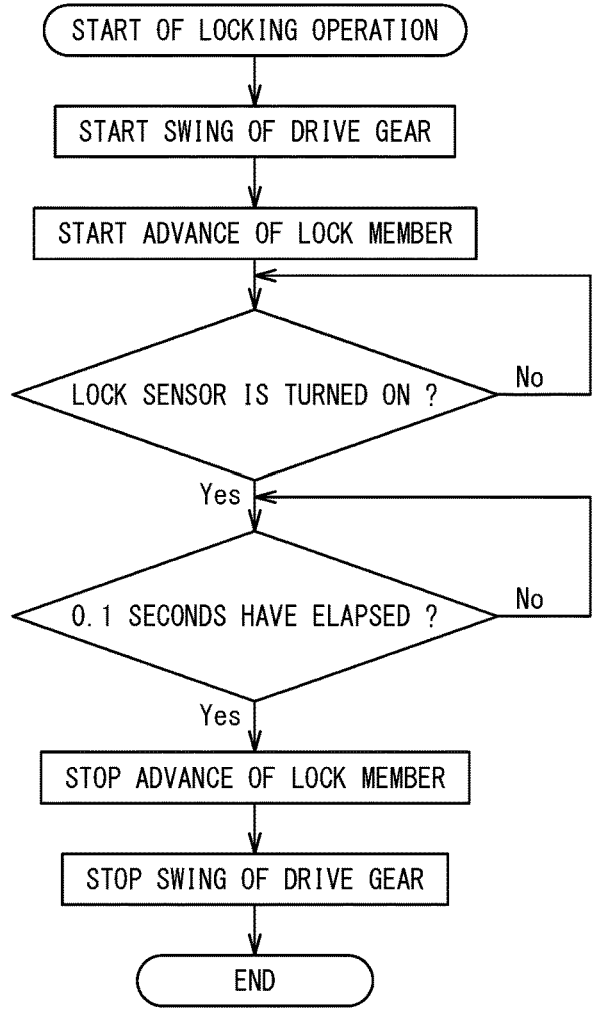
FIG. 18 is a flowchart for illustrating another control flow of the locking operation.

FIG. 18 is a flowchart for illustrating another control flow of the locking operation.

In the flow illustrated in FIG. 18, when the locking operation is started, the drive gear 30 is swung, and the lock member 60 is advanced. Then, when insertion of the distal end portion of the lock member 60 into the engagement hole 30a is started, the lock member 60 comes into contact with the contact element 69a of the lock sensor 69, and the advanced and retreated positions thereof are thus detected. Then, when a predetermined period (0.1 seconds in this example) has elapsed, the advance of the lock member 60 is stopped. Moreover, simultaneously with the stop of the drive by the locking motor 64, the swing of the drive gear 30 is also stopped. As a result, the lock member 60 is completely inserted into the engagement hole 30a, and brought into and maintained in the locking state in which the lock member 60 can be engaged with the engagement hole 30a.

Figure 19:
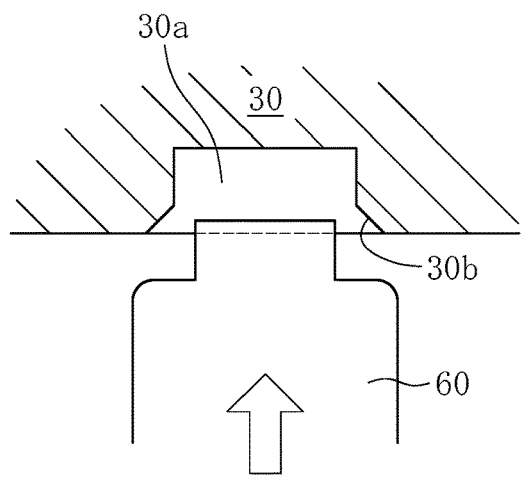
FIG. 19 is an explanatory view for illustrating a timing of detecting a position of the lock member.

In such a manner, in the example illustrated in FIG. 18, when insertion of the distal end portion of the lock member 60 into at least the engagement hole 30a is started, the position of the lock member 60 is detected by the lock sensor 69, and the advance of the lock member 60 is stopped when the predetermined period has elapsed after the timing of the detection. With such control, the lock member 60 can reliably be inserted into the engagement hole 30a. In other words, the timing of stopping the advance of the lock member 60 is set to a time point when the predetermined period has elapsed after count is started when insertion of the lock member 60 into at least the engagement hole 30a is started. Thus, a state of insertion of the lock member 60 into the engagement hole 30a can be managed so as not to be insufficient or excessive. In this example, the false detection of the lock sensor 69 due to the chattering is disregarded. Moreover, the predetermined period from the detection of the position of the lock member 60 to the stop of the advance of the lock member 60 can appropriately be changed. Moreover, as illustrated in FIG. 19, when the tilted surface 30b is formed at the entrance portion of the engagement hole 30a, the timing of detecting the position of the lock member 60 by the lock sensor 69 may be a timing at which insertion of the distal end portion of the lock member 60 into a portion of the tilted surface 30b is started or a timing at which the distal end portion of the lock member 60 has passed the tilted surface 30b.

Moreover, for reducing the displacement of the stop position in the linear motion direction along with the rotation of the drive gear 30 for the phase matching as much as possible, in other words, for reducing the rotation amount of the drive gear 30 for the phase matching as much as possible, it is also effective to set the pitch between the engagement holes 30a to be small. A relationship between the rotation angle Y [°] of the drive gear 30 and a displacement amount X [mm] in the linear motion direction of the output shaft (ball screw shaft 24) of the electric actuator is represented by Expression (1) where L [mm] is a lead of the ball screw 22, and r1/r2 is a gear ratio of the drive gear 30 to the driven gear 31 (number of teeth of drive gear/number of teeth of driven gear).

$$X = Y/360 * (r1/r2) * L \qquad \text{Expression (1)}$$

For example, when L=3 [mm] and r1/r2=32/50, Expression (1) is represented as $X=Y/360*(32/50)*3=5.33Y*10^{-3}$. Then, in this case, for example, when the displacement amount X in the linear motion direction of the output shaft of the electric actuator ranges from 0.1 [mm] to 0.2 [mm], by assigning to X=0.1 [mm] and X=0.2 [mm] to Expression (1), a range of the rotation angle Y of the drive gear 30 corresponding to those values is obtained. Specifically, from expressions to which X=0.1 [mm] and X=0.2 [mm] are respectively assigned ($0.1=5.33Y*10^{-3}$ and $0.2=5.33Y*10^{-3}$), Y=18.75[°] and Y=37.5[°] are obtained, and hence a corresponding range of the rotation angle Y of the drive gear 30 is 18.75[°]≤Y≤37.5[°]. Thus, the displacement of the stop position in the linear motion direction (displacement amount X in the linear motion direction of the output shaft of the electric actuator) can be suppressed to the range of from 0.1 [mm] to 0.2 [mm] by setting a magnitude of the pitch between the engagement holes 30a so that the rotation amount (rotation angle Y) of the drive gear 30 for the phase matching is 18.75[°]≤Y≤37.5 [°].

Figure 20:
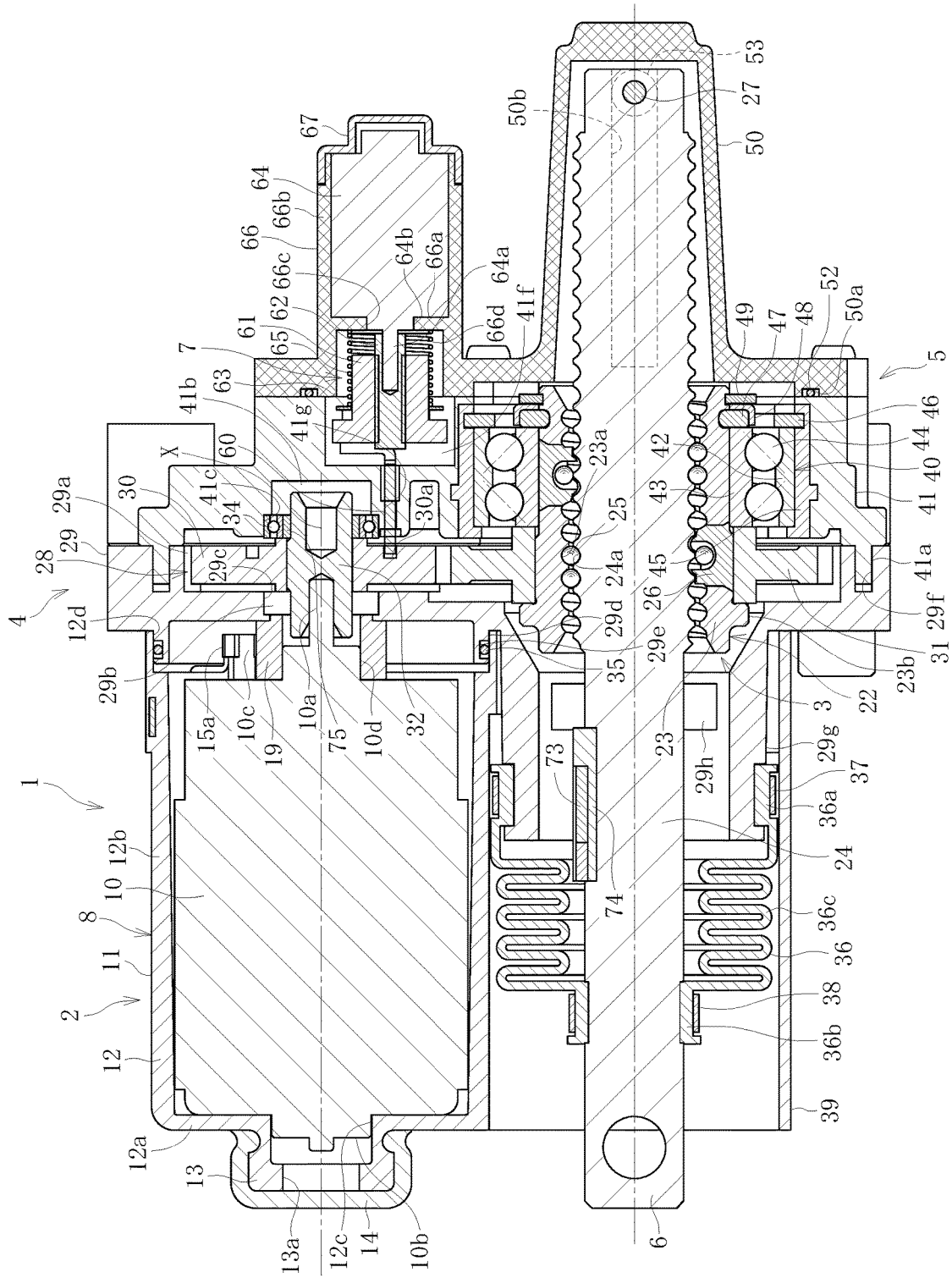
FIG. 20 is a vertical sectional view of the electric actuator according to still another embodiment of the present invention.
Figure 21:
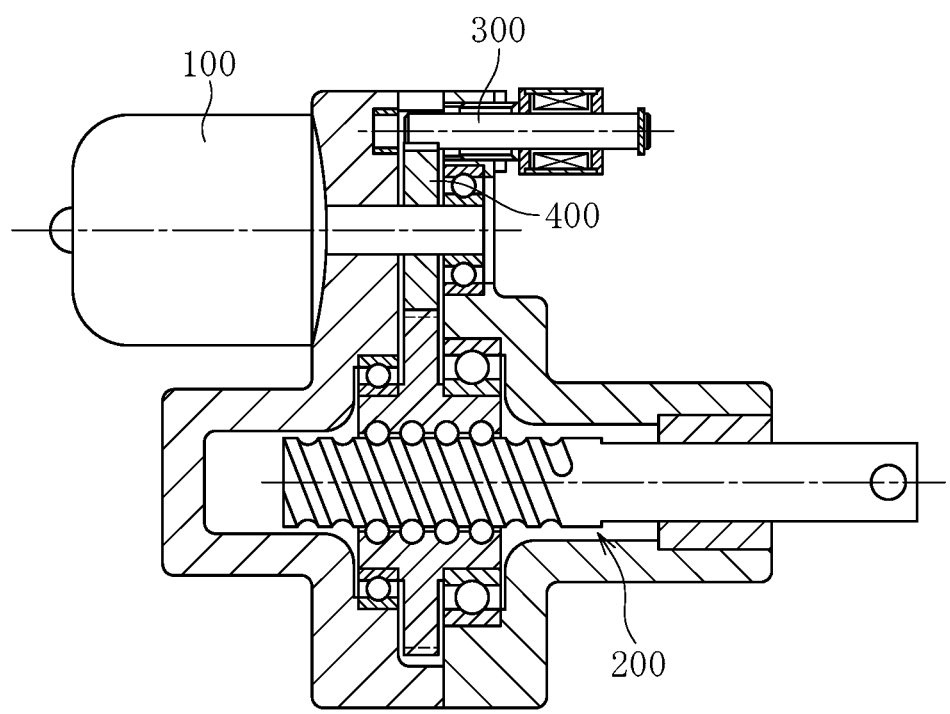
FIG. 21 is a vertical sectional view of a related-art electric linear actuator.

FIG. 20 is a view of the electric actuator 1 according to still another embodiment of the present invention.

The electric actuator 1 illustrated in FIG. 20 is configured, compared with the electric actuator 1 illustrated in FIG. 1, by eliminating the speed reduction mechanism part 9, directly coupling the motor part 8 and the driving force transmission part 4 to each other. In this case, the speed reduction mechanism part 9 is not provided. Thus, the output shaft 10a of the driving motor 10 is press-fitted to the gear boss 32, and the rolling bearing 33 on the transmission gear case 29 side configured to support the gear boss 32 is omitted. Moreover, a member to be fitted to the motor adaptor 19, to which the driving motor 10 is mounted, is changed from the speed reduction gear case 17 to the transmission gear case 29, and is thus replaced by one having a different shape conforming to a fitting shape of the member to be fitted to the motor adaptor 19. The other configurations are the same as those of the embodiment illustrated in FIG. 1. The electric actuator 1 of the embodiment illustrated in FIG. 20 is controlled to operate basically in the same manner as in the embodiments described above except that the driving force from the driving motor 10 is directly transmitted to the driving force transmission part 4 without intermediation of the speed reduction mechanism part 9. Thus, description of the control and the operation is omitted.

Also in the electric actuator 1 illustrated in FIG. 20, as in the electric actuator 1 illustrated in FIG. 1, the lock mechanism part 7 is arranged on the opposite side of the drive part 2 with respect to the drive gear 30, and on the motion conversion mechanism part 3 side with respect to the rotation center line X of the drive gear 30. Thus, the downsizing of the electric actuator 1 can be achieved. Moreover, the lock mechanism part 7 is configured to be engaged with the drive gear 30 on the motion conversion mechanism part 3 side with respect to the rotation center line X of the drive gear 30, and the downsizing is thus promoted.

As described above, with the present invention, the lock mechanism part 7 can be arranged close to the motion conversion mechanism part 3 without considering the interference with the drive part 2, and hence the downsizing of the electric actuator 1 can be achieved. As a result, the downsizing of devices and machines on which the electric actuator is mounted can also be achieved. Thus, the configuration of the electric actuator according to the present invention is also preferred when the electric actuator is produced as series, and is deployed as a plurality of types adapted to applications and usages such as an electric parking brake mechanism for vehicles including two-wheeled vehicles, an electric/hydraulic brake mechanism, an electric shift change mechanism, and an electric power steering as well as a 2WD/4WD electric switching mechanism and an electric shift change mechanism for an outboard engine (for a vessel propulsion engine).

Although the embodiments of the present invention are described above, the lock mechanism part 7 is not limited to one that employs the sliding screw device, but may be one that employs a ball screw device.

The embodiments employ such a configuration that the sliding screw nut 61 is caused to perform the linear motion by rotating the sliding screw shaft 62. Conversely, the sliding screw shaft 62 may be caused to perform the linear motion by rotating the sliding screw nut 61. In other words, with the configuration in which the sliding screw nut 61 is fixed to the output shaft 64a of the locking motor 64 and the sliding screw shaft 62 is fixed to the lock member 60, the sliding screw nut 61 can be rotated by the drive by the locking motor 64, and the sliding screw shaft 62 can be caused to perform a linear motion integrally with the lock member 60.

Moreover, in the embodiments, although the locking motor (rotary motor) 64 is used as the driving source of retreating the lock member 60 release the locking state, the locking motor 64 may be used as a driving source to bring the lock member 60 into the locking state (to advance the lock member 60) or may be used as a driving source to switch the lock member 60 between both of the locking state and the unlocking state (to advance and retreat the lock member 60).

The support bearing 40 configured to support the motion conversion mechanism part 3 is not limited to the configuration of using the double-row angular contact ball bearing. A pair of single-row angular contact ball bearings may be used in combination. Moreover, as the support bearing 40, in addition to the angular contact ball bearing, another double-row bearing using, for example, a deep groove ball bearing may be applied.

The motion conversion mechanism part 3 may be a sliding screw device. However, the ball screw 22 is more preferred in terms of reducing the rotation torque to downsize the driving motor 10.

Moreover, the speed reduction mechanism part 9 may be a speed reduction mechanism other than the planetary-gear speed reduction mechanism 18.

The present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

REFERENCE SIGNS LIST 1 electric actuator
2 drive part
3 motion conversion mechanism part
4 driving force transmission part
5 motion-conversion-mechanism support part
6 operation part
7 lock mechanism part
8 motor part
9 speed reduction mechanism part
10 driving motor
10a output shaft
28 transmission gear mechanism
30 drive gear (first gear)
30a engagement hole
31 driven gear (second gear)
50 shaft case
60 lock member
61 sliding screw nut
62 sliding screw shaft
64 locking motor
65 spring
66 holder portion
69 lock sensor
X rotation center line of drive gear

The invention claimed is:

1. An electric actuator comprising:
a drive part;
a motion conversion mechanism part configured to convert a rotary motion from the drive part into a linear motion in an axial direction in parallel with an output shaft of the drive part;
a driving force transmission part comprising a transmission gear mechanism configured to transmit a driving force from the drive part to the motion conversion mechanism part; and
a lock mechanism part configured to prevent the motion conversion mechanism part from converting the rotary motion into the linear motion,
wherein the transmission gear mechanism comprises a first gear and a second gear, the first gear having an engagement hole,
wherein the lock mechanism part is configured to restrict a rotation of the first gear so as to prevent the motion conversion mechanism part from converting the rotary motion into the linear motion through engagement with the first gear at a side of a rotation center line of the first gear at which the motion conversion mechanism is arranged, and
wherein the lock mechanism part comprises:
a lock member that is switchable between a locking state in which the lock member is engaged with the engagement hole of the first gear and an unlocking state in which the locking state is released;
a spring that is configured to urge the lock member in a direction that brings the lock member into the locking state; and
a rotary motor that, when the drive part performs driving, is configured to drive the lock member so that the lock member is switched to the unlocking state against an urging force of the spring.

2. The electric actuator according to claim 1, wherein the rotary motion of the drive part is transmitted from the first gear to the second gear while a speed of the rotary motion is reduced.

3. The electric actuator according to claim 1, wherein the engagement hole is formed in a side surface of the first gear crossing the axial direction.

4. The electric actuator according to claim 3, wherein the lock mechanism part further comprises:

a sliding screw device configured to convert a rotary motion of the rotary motor into a linear motion, to thereby drive the lock member so as to bring the lock member into at least any one of the locking state and the unlocking state.

5. The electric actuator according to claim 4, further comprising an actuator case, which comprises a rotation restriction part configured to restrict a rotation of a member of the sliding screw device performing the linear motion when the rotary motor performs rotational drive.

6. The electric actuator according to claim 5,
wherein one of a sliding screw nut and a sliding screw shaft forming the sliding screw device is fixed to the lock member, and another one of the sliding screw nut and the sliding screw shaft is fixed to an output shaft of the rotary motor,
wherein a distal end portion side of the lock member has a flat plate shape, and
wherein a through hole having a rectangular cross section, into which the distal end portion side of the lock member is inserted, is formed in the actuator case.

7. The electric actuator according to claim 6, wherein the distal end portion side of the lock member is arranged coaxially with the output shaft of the rotary motor.

* * * * *